(12) United States Patent
Muinonen et al.

(10) Patent No.: US 7,657,348 B2
(45) Date of Patent: Feb. 2, 2010

(54) SYSTEM AND METHOD FOR COMPUTING RAIL CAR SWITCHING SOLUTIONS USING DYNAMIC CLASSIFICATION TRACK ALLOCATION

(75) Inventors: Kari Muinonen, Roxboro (CA); Anshu Pathak, Dolland-des-Ormeaux (CA); Matthew Barker, Sherwood Park (CA); Vincent Morency, Montreal (CA); Gordon Doyle, Markham (CA)

(73) Assignee: Canadian National Railway Company, Montreal, Quebec (CA)

( * ) Notice: Subject to any disclaimer, the term of this patent is extended or adjusted under 35 U.S.C. 154(b) by 151 days.

(21) Appl. No.: 11/387,474

(22) Filed: Mar. 23, 2006

(65) Prior Publication Data

US 2007/0156304 A1    Jul. 5, 2007

Related U.S. Application Data

(60) Provisional application No. 60/754,601, filed on Dec. 30, 2005.

(51) Int. Cl.
*G06F 7/00* (2006.01)
*G06F 17/00* (2006.01)
*B61L 17/00* (2006.01)

(52) U.S. Cl. ............. 701/19; 701/1; 246/2 R; 246/167; 246/176; 246/182; 246/219; 246/220; 705/7; 705/8

(58) Field of Classification Search ........ 701/1, 701/19; 246/2 R, 167, 176, 182, 219, 220; 705/7, 8
See application file for complete search history.

(56) References Cited

U.S. PATENT DOCUMENTS

| | | | |
|---|---|---|---|
| 3,727,559 A * | 4/1973 | McCune et al. | ............. 104/26.1 |
| 3,865,042 A | 2/1975 | DePaola et al. | |
| 4,610,206 A * | 9/1986 | Kubala et al. | ............. 104/26.1 |
| 4,883,245 A | 11/1989 | Erickson, Jr. | |
| 5,129,605 A | 7/1992 | Burns et al. | |
| 5,465,926 A | 11/1995 | Brown | |
| 5,623,413 A | 4/1997 | Matheson et al. | |
| 5,794,172 A | 8/1998 | Matheson et al. | |
| 6,076,067 A | 6/2000 | Jacobs et al. | |
| 6,154,735 A | 11/2000 | Crone | |
| 6,377,877 B1 | 4/2002 | Doner | |
| 6,418,854 B1 * | 7/2002 | Kraft | ............. 104/26.1 |
| 6,516,727 B2 | 2/2003 | Kraft | |
| 6,519,595 B1 * | 2/2003 | Rose | ............. 707/10 |
| 6,587,738 B1 * | 7/2003 | Belcea | ............. 700/33 |
| 6,789,005 B2 | 9/2004 | Hawthorne | |
| 6,832,204 B1 | 12/2004 | Doner | |

(Continued)

FOREIGN PATENT DOCUMENTS

CA    1 253 244    4/1989

(Continued)

*Primary Examiner*—Jack W. Keith
*Assistant Examiner*—Chuong P Nguyen
(74) *Attorney, Agent, or Firm*—Ladas & Parry LLP

(57) ABSTRACT

A system for computing car switching solutions in a railway switch yard. The system is computer based and has an input for receiving data conveying information about one or more arrival trains arriving at the switch yard and data conveying information about departure trains to depart the switch yard. A processing entity processes the data and computes car switching solutions for the railcars.

9 Claims, 12 Drawing Sheets

U.S. PATENT DOCUMENTS

| | | | |
|---|---|---|---|
| 6,856,865 B2 | 2/2005 | Hawthorne | |
| 6,961,682 B2 | 11/2005 | Doner | |
| 7,457,691 B2 * | 11/2008 | Muinonen et al. | 701/19 |
| 2001/0034642 A1 | 10/2001 | Doner | |
| 2002/0082814 A1 * | 6/2002 | Doner | 703/6 |
| 2002/0096081 A1 * | 7/2002 | Kraft | 104/26.1 |
| 2002/0173884 A1 | 11/2002 | Clawson | |
| 2004/0111309 A1 | 6/2004 | Matheson et al. | |

FOREIGN PATENT DOCUMENTS

| | | |
|---|---|---|
| CA | 1 269 749 | 5/1990 |
| CA | 1 293 960 | 1/1992 |
| CA | 2 143 875 | 9/1998 |
| CA | 2 291 057 | 11/1998 |
| CA | 2 175 776 | 1/2001 |
| CA | 2 382 972 | 3/2001 |
| CA | 2 429 520 | 5/2001 |
| CA | 2 395 062 | 7/2001 |
| CA | 2 395 064 | 7/2001 |
| CA | 2 395 065 | 7/2001 |
| CA | 2 395 395 | 7/2001 |
| CA | 2 395 821 | 7/2001 |
| CA | 2 356 760 | 3/2002 |
| CA | 2 364 152 | 5/2002 |
| CA | 2 364 153 | 5/2002 |
| CA | 2 364 155 | 5/2002 |
| CA | 2 364 157 | 5/2002 |
| CA | 2 198 855 | 6/2002 |
| CA | 2 431 868 | 7/2002 |
| CA | 2 413 080 | 8/2002 |
| CA | 2 433 737 | 8/2002 |
| CA | 2 374 166 | 9/2002 |
| CA | 2 196 631 | 11/2002 |
| CA | 2 279 528 | 11/2002 |
| CA | 2 476 400 | 8/2003 |
| CA | 2 484 720 | 11/2003 |
| CA | 2 486 532 | 11/2003 |
| CA | 2 494 145 | 2/2004 |
| CA | 2 449 181 | 5/2004 |
| CA | 2 500 797 | 5/2004 |
| CA | 2 454 739 | 7/2004 |
| CA | 2 459 212 | 8/2004 |
| CA | 2 459 213 | 8/2004 |
| CA | 2 431 636 | 12/2004 |
| CA | 2 281 604 | 4/2005 |
| CA | 2 281 683 | 11/2005 |
| WO | WO 02/042142 | 5/2002 |
| WO | WO 03/090397 | 10/2003 |
| WO | WO 2004/074067 | 9/2004 |
| WO | WO 2004/074068 | 9/2004 |

* cited by examiner

SYSTEM AND METHOD FOR COMPUTING RAIL CAR SWITCHING SOLUTIONS USING DYNAMIC CLASSIFICATION TRACK ALLOCATION

CROSS-REFERENCE TO RELATED APPLICATIONS

This application claims the benefit of priority on the previously filed U.S. provisional application entitled "RAILROAD SWITCHYARD MANAGEMENT PROCESS AND RELATED INFRASTRUCTURE" filed on Dec. 30, 2005 by Kari Muinonen et al. and which was assigned Ser. No. 60/754,601. The contents of the above application are incorporated herein by reference.

FIELD OF THE INVENTION

The invention relates to a process for managing operations in a railroad switchyard. The invention also encompasses a technological platform and individual components thereof to implement the process.

BACKGROUND OF THE INVENTION

A railroad network normally contains one or more switchyards in which cars are routed from tracks leading from a departure point to tracks going to a destination point. A typical switchyard has four main components, namely receiving tracks, a car switching mechanism, a set of classification tracks and a set of departure tracks. Incoming trains deliver cars in the receiving tracks. The cars are processed by the switching mechanism that routes individual cars to respective classification tracks.

Two types of switching mechanisms are in use today. The first one is a hump switch. Switch yards that use a hump switch are referred to as hump yards. A hump switch yard uses a hump over which a car is pushed by a locomotive. At the top of the hump the car is allowed to roll on the other side of the hump under the effect of gravity. Retarders keep the car from reaching excessive speeds. The hump tracks on which the car rolls down the hump connect with the classification tracks. A track switch establishes a temporary connection between the hump tracks and a selected one of the classification tracks such that the car can roll in the classification tracks. A departure train is constituted when the requisite number of cars has been placed in a set of classification tracks. When the departure train leaves the switchyard, the set of classification tracks become available for building a new departure train.

The second type of switch mechanism is a flat switch. The principle is generally the same as a hump yard except that instead of using gravity to direct cars to selected classification tracks, a locomotive is used to push the car from the receiving tracks to the selected set of classification tracks.

In order to increase the efficiency of switching operations railway companies have developed the concept of car blocking. Under this concept, a block of cars, hence the name "blocking", may be logically switched as a unit in a switch yard. A block is established on a basis of certain properties shared by the cars belonging to the block. For instance cars that have a common destination point on their route can be blocked together. A "block" is therefore a logical entity that helps making switching decisions. For reference it should be noted that generally, two types of blocks exist. There is the so called "yard block" and a "train block". For clarity, the term "block" alone in the present specification encompasses either a yard block or a train block.

The principle of blocking, either yard blocking or train blocking increases the efficiency with which cars are processed at switch yards. However, it also brings constraints. Very often a train block must be assembled from cars that arrive on different incoming trains. The train block will be complete and available for departure only when all the cars that make up the train block have arrived at the switch yard. If one or more of the cars are delayed the train block cannot be completed and the entire departing train that pulls this train block may leave without the train block. Such occurrence may create a cascading effect throughout entire segments of the railroad network and have significant financial repercussions for the railroad operator. Specifically, it is not uncommon for an operator to guarantee car arrival times to customers and delays incur financial penalties that may be significant.

Against this background, it can be seen that a need exists in the industry to develop more refined processes to manage operations in a switch yard such as to increase the efficiency with which cars are switched.

SUMMARY OF THE INVENTION

As embodied and broadly described herein the invention also includes a system for computing car switching solutions in a railway switch yard containing a plurality of classification tracks, comprising:
  a) an input for receiving:
    i) first data conveying information about one or more arrival trains arriving at the switch yard, an arrival train including a plurality of cars;
    ii) second data conveying information about two or more departure trains to depart the switch yard;
  b) a processing entity for processing the first data and the second data to compute car switching solutions concurrently locating a first set of cars and a second set of cars in a common classification track, wherein the first and second sets of cars belong to train blocks of different departure trains.

As embodied and broadly described herein the invention also provides a system for computing car switching solutions in a railway switch yard containing a plurality of classification tracks, comprising:
  a) an input for receiving:
    i) first data conveying information about one or more arrival trains arriving at the switch yard, an arrival train including a plurality of cars;
    ii) second data conveying information about two or more departure trains to depart the switch yard;
  b) a processing entity for processing the first data and the second data to compute car switching solutions concurrently locating a first set of cars and a second set of cars in a common classification track, wherein the first and second sets of cars belong to train blocks of different departure trains.

BRIEF DESCRIPTION OF THE DRAWINGS

A detailed description of examples of implementation of the present invention is provided hereinbelow with reference to the following drawings, in which.

Figure 1:
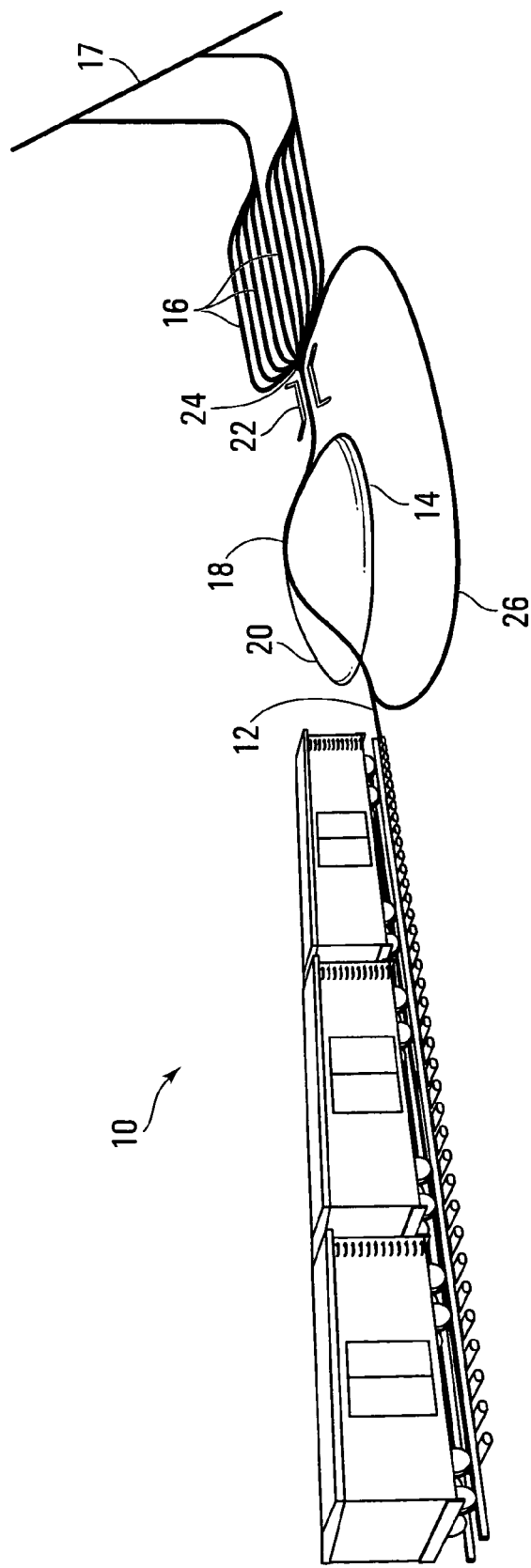
FIG. 1 is a schematical illustration of a hump switch yard.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 is an illustration of a hump switching yard in which the management process of the invention can be implemented. The hump switching yard 10 has four main components namely receiving tracks 12, a hump 14, classification tracks 16 and departure tracks 17. The receiving tracks 12 include railway sections in which an incoming train delivers cars to be switched.

The receiving tracks 12 lead to the hump 14. The hump 14 includes a set of tracks 20 that lead to the hump crest 18 that is the highest elevation of the hump 14. Cars are pushed by a locomotive on the tracks 20 up to the hump crest 18 at which point the car rolls down the hump 14 by gravity toward the set of classification tracks 16. The car passes through retarders 22 that will reduce its speed allowing it to gently coast in anyone of the selected classification tracks 16. A track switch 24, located downstream the retarders 22 temporarily connects the hump track 12 to a selected one of the classification tracks 16 such as to direct the car to the desired classification track 16.

The receiving tracks 12, therefore, form a switching queue in which cars that are delivered to the switching yard 10, await to be switched.

The classification tracks 16 lead to the departure tracks 17. Specifically, the classification tracks are arranged into groups, where each group leads to a departure track 17. The hump switch yard 10 shown in the drawings includes 10 classification tracks organized into two groups of five tracks. Each group of five tracks connects to the departure track 17.

Generally, the classification tracks 16 are used to assemble train blocks. Train blocks are pulled out of the classification tracks into the departure tracks 17 where the actual departure train is built. The departure tracks 17 allow assembling trains having more cars than a single classification track can hold. When a complete train (short train) is assembled into a single classification track 16, the departure train leaves that track directly by passing through the departure track 17.

It should be appreciated that FIG. 1 is a very simplified illustration of a hump switch yard in that the number of tracks shown has been significantly reduced for clarity purposes. An average size hump yard typically contains many more classification tracks than what is shown in FIG. 1. For example it would not be uncommon for a switchyard to have 80 or more classification tracks organized into physical groups of tracks, where each group connects to a departure track. In addition, there will normally be a larger number of departure tracks 17 than what appears on the drawing.

The hump switch yard 10 also includes a reswitching track that allows to "recirculate" cars from a position downstream the switch 24 to a position upstream the switch 24. In a typical hump switch yard, such as the yard 10 the reswitching track is called "rehump track". The rehump track is shown at 26 in FIG. 1. The rehump track 26 originates downstream the track switch 24 and lead to the hump tracks 20 at the base of the hump 20. The purpose of the rehump tracks 26 is to provide a buffering mechanism where one or more cars can be temporarily put in storage without blocking the flow of other cars through the hump switch yard 10. For instance, situations may arise where one or more cars in the receiving tracks 12 cannot be switched in any one of the classification tracks 16. This may be due, for example to the lack of space availability in the classification tracks 16. It is common practice for a hump switch yard 10 to periodically hump the cars in the rehump tracks 26. Such rehumping involves pushing the cars over the hump 20 such that they can be switched to a selected classification track 16. If a car cannot be routed to any one of the classification tracks 16 it is put back in the rehump tracks 26 for a new humping cycle.

The following description of a non-limiting example of implementation of a switch yard management process will be done in connection with a hump switch yard 10 of the type described earlier. However, it should be expressly noted that the principles of the invention apply equally well to a flat switch yard. Accordingly, the invention should not be limited to a hump switch yard but encompasses a flat switch yard as well. A flat switch yard operates generally in the same way as described earlier in that incoming trains deliver cars at the input side of the flat switch yard, a switching device routes the individual cars to classification tracks to assemble departure trains in departure tracks.

Figure 2:
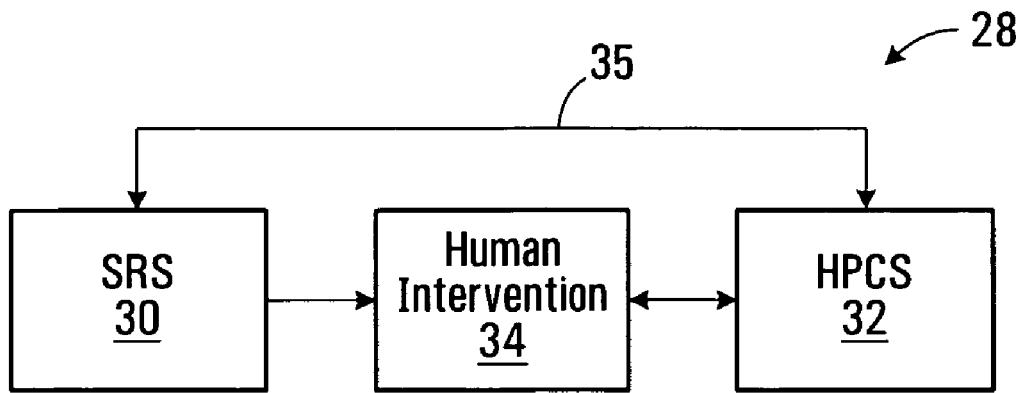
FIG. 2 is a high level block diagram of a prior art computer based switch yard management system.

FIG. 2 illustrates a block diagram of a prior art control system 28 for use in managing the operations of a hump switch yard 10. Specifically, the control system 28 includes two main components, namely the Service Reliability System (SRS) component 30 and the Hump Process Control System (HPCS) 32. The SRS component 30 is in essence a railway traffic management system that keeps track of the rolling stock inventory throughout the network. It is used to manage the flow of railway traffic over a complete railway network or a portion thereof. The SRS component 30 is a computer based system that reflects the railway operations by showing information on trains, schedules, waybills, trip plans and train delays. The SRS component 30 has a number of sub-systems that are integrated to one another. Some of the sub-components are briefly described below:

Waybill—a computer file that provides details and instructions on the movement of cars. Cars and units cannot move without a waybill;

Service Scheduling—the service scheduling sub-component is based on a trip plan that specifies the events a shipment must follow from origin to destination. A trip plan identifies the train connections for each car and provides a destination Estimated Time of Arrival (ETA). The service scheduling sub-component continuously monitors the movement of each shipment and compares its progress to the trip plan. If the service scheduling determines that a shipment will not meet the established requirements, it triggers alarms;

Yard Operating Plan/Daily Operating Plan (YOP/DOP)—the YOP sub-component defines how assets (crews, cars, locomotives and tracks) are allocated to support yard related activities. The DOP is derived from the YOP and contains instructions for industrial assignments;

Yard, Industry and Train (YIT)—the YIT sub-component allows users to report train and car movements such as train arrivals and departures, yard switches, exchange of cars with other railroads, and the placing and pulling of cars at a customer sidings.

Intermodal—this sub-component includes functions for gating-in, gating-out, assigning, ramping, de-ramping as well as maintaining inventories of Intermodal equipment.

The SRS component 30 includes a processing function that is illustrated as a single block, but it can be implemented also in a distributed fashion.

It should be expressly noted that the SRS component 30 is merely an example of a railway traffic management system and other railway traffic management systems can be used without departing from the spirit of the invention.

The HPCS component 32 operates the track switch in the hump switch yard 10. Essentially, the HPCS component 32 is a car switch control system that determines on the basis of inputs the position of the track switch 24 such that a car or a series of cars over the hump, will be directed to the desired classification track 16. Broadly stated, the HPCS component 32 has two main goals, namely:

Deliver the cars to the correct classification track 16;

Insure that the cars will arrive in the classification track 16 fast enough to reach the cars already in the track but slow enough for a safe coupling (or reach the far end of the track if it is empty);

As in the case with the SRS component 30, the HPCS component 32 is illustrated as a single block but it can be implemented in a distributed fashion.

It should be expressly noted that the HPCS component 32 is merely an example of a car switch control system and other car switch control systems can be used without departing from the spirit of the invention.

As shown by FIG. 2 a human intervention 34 is required to interface the SRS component 30 and the HPCS component 32. Specifically, the SRS component identifies the trains that are scheduled to arrive at the hump switch yard 10 and the trains that are scheduled to depart the hump switch yard 10. On the basis of this information a hump list is manually produced. The hump list determines in which classification track the various cars will go. The hump list is then loaded into the HPCS component 32. The HPCS component 32 performs the switching as the cars are humped, according to the specific switching instructions in the hump list.

In order to simplify the car switching logic, it is customary to assign classification tracks 16 to destinations. For instance there is the "Edmonton" classification track, the "Montreal" classification track, etc. Cars that go to Edmonton are switched to the Edmonton classification track, cars that go to Montreal are switched to the Montreal track, etc.

Note the communication link 35 between the HPCS component 32 and the SRS component 30. This link 35 illustrates the exchange of data between the two components, for instance the HPCS component 32 notifying the SRS component 30 of events or conditions occurring in the hump switch yard 10.

Figure 3:
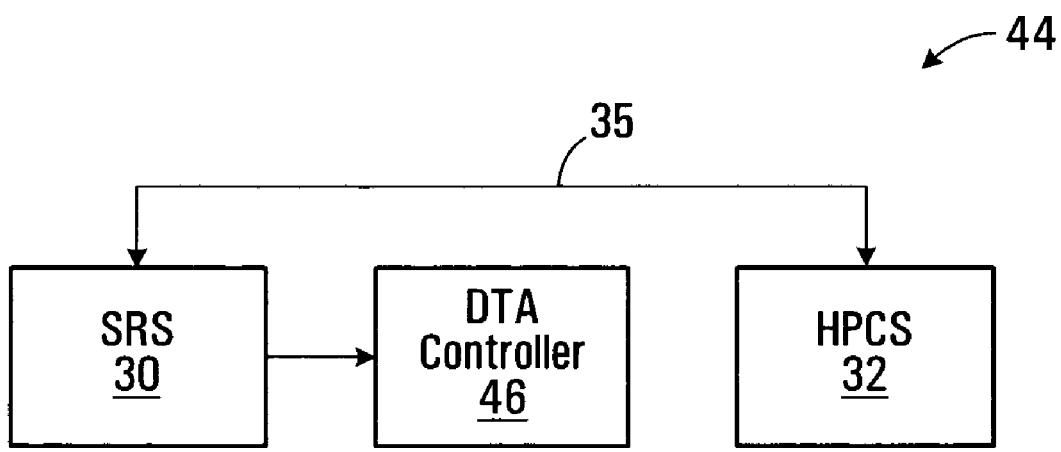
FIG. 3 is a high level block diagram of a computer based switch yard management system according to a non-limiting example of implementation of the invention.

FIG. 3 is a block diagram of control system 44 for use in managing the operations of the hump switch yard 10, according to a non-limiting example of implementation of the invention. The control system 44 includes three main components two of which are shared with the prior art control system 28 described earlier. Specifically, the control system 44 includes the SRS component 30, the HPCS component 32 and a Dynamic Track Allocation (DTA) controller 46. The DTA controller 46 is responsible for allocation of cars to the classification tracks 16.

Figure 4:
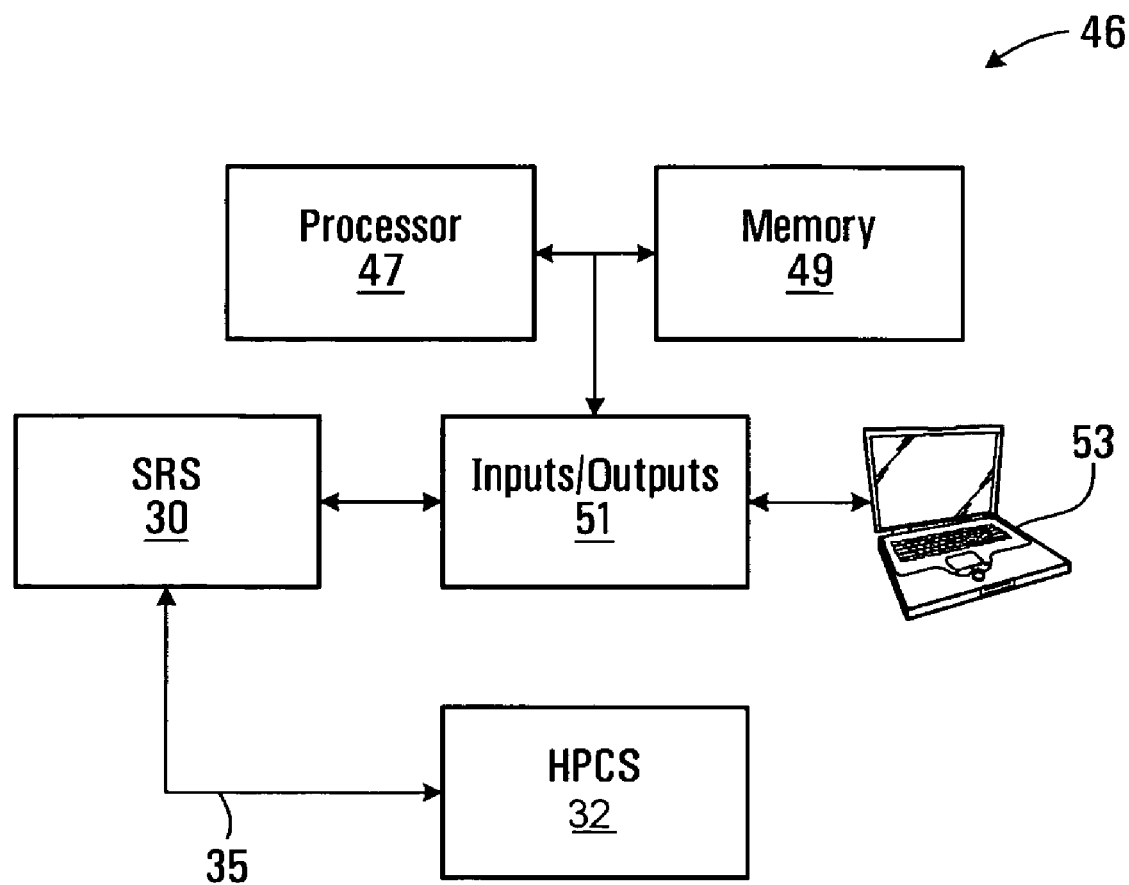
FIG. 4 is a more detailed block diagram of the system shown in FIG. 3.

FIG. 4 is a block diagram of the DTA controller 46, showing the relationships with the SRS component 30 and the HPCS component 32. The DTA controller 46 has a computing platform including a processor 47 that communicates with a machine readable storage unit 49, commonly referred to as "memory" over a data bus. Inputs and outputs (I/O interface) 51 allow the DTA controller 46 to receive and send data to the SRS component 30 and the HPCS controller 32, via the SRS component 30. In addition, the I/O 51 communicates with a user interface 53 that allows the DTA controller 46 to communicate information to the yard master and receive commands or other inputs from the yard master. In essence, the user interface 53 shows the yard master the switching solutions that the DTA controller 46 is developing. Those switching solutions can be implemented either automatically, i.e. pending an input from the yard master that stops the process, the proposed switching solutions are executed, or they may require explicit conformation from the yard master. For instance unless the yard master inputs at the user interface 53 a command to explicitly implement or authorize the switching solution presented by the DTA controller 46 on the user interface 53, no action is taken by the system.

Note that while the diagram at FIG. 4 depicts the DTA controller 46 as a single unit, it can also have a distributed architecture without departing from the spirit of the invention.

The functionality of the DTA controller 46 is software defined. In other words, the logic that determines how cars are to be switched is implemented by executing software by the processor 47. The software in the form of program code is stored in the memory 49. The software reads data inputs received from the SRS component 30, and from the user interface 53. On the basis of those inputs, the DTA controller 46 generates outputs to the user interface 53. The output to the user interface 53 is intended to display information to inform the yard master on the switching solutions the DTA controller 46 has reached. Optionally, an output may also be directed to the HPCS component 32, which contains switching commands that determine the positions of the track switch 24 and effectively implement the switching solutions developed by the DTA controller 46.

It should be expressly noted that the present invention does not absolutely require the generation of control signals to the HPCS controller 32. While this option is considered advantageous, variants can be envisaged where there is in fact, no direct command given by the DTA controller 46 to the HPCS component 32. For instance, the DTA controller 46 can compute switching solutions that are presented to the yard master or another operator and manually implemented or manually authorized.

As indicated earlier, the DTA controller 46 determines how the hump switch yard 10 will allocate cars in the classification tracks 16. This is done on the basis of various parameters that will be discussed below. In addition, the DTA controller 46 is provided with some degree of flexibility in determining the make up of train blocks such as, for example, collapse train blocks when it is not appropriate to continue assembling them or splitting big train blocks into smaller ones in order to make better use of existing space in classification tracks 16. Another feature of the DTA controller 46 logic is allowing a dynamic car re-distribution. This is particularly suitable for empty cars that need to be delivered by the railroad operator to the customer or car owner.

In the example illustrated in FIG. 4, the DTA controller 46 logically resides between the SRS component 30 and the HPCS component 32. As such the DTA controller 46 receives information from the SRS component 30 about:

Incoming trains (trains to be received in the hump switch yard 10), in particular:
Identification of the train (Train ID)
The Expected Time of Arrival (ETA);
Point of origin;
Destination;
Identification of the train blocks that make up the train;
The number of cars in each train block;
The identification of each car (car ID);
The destination of the car;
The route of the car;
If the car carries cargo, the type of cargo; and
If the car is empty the customer that has requested the car to be moved.

Departure trains (trains the switch yard 10 is expected to assemble):
Identification of the train (Train ID)
The Expected Time of Departure (ETD);
Identification of the train blocks that make up the train;
The number of cars in each train block;
The identification of each car (car ID);
The destination of the car;
The route of the car;
If the car carries cargo, the type of cargo; and
If the car is empty, the customer that has requested the car to be moved.

In order to make classification track assignments to individual cars, the DTA controller 46 creates representations in the memory 49 of the rolling stock that transits through the hump switch yard 10 by using hierarchal objects. Generally, three types of objects exist:

A train object. A train object is associated with each train (arrival train or departure train) and it has properties such as:
A train identifier (train ID);
Expected time of arrival (ETA);
Origin;
Destination;
Route; and
Identification of train blocks that make up the train.

A train block object. A train block object is associated with a block of cars and has the following properties:
A train block identifier (train block ID);
Number of cars making up the train block;
Identity of the cars making up the train block;
Destination of the train block; and
Route of the train block from the origin to the destination.

A yard block object. A yard block object is associated with a block of cars and has the following properties:
A yard block identifier (yard block ID);
Number of cars making up the yard block;
Identity of the cars making up the yard block;
Origin of the yard block;
Destination of the yard block; and
Route of the yard block from the origin to the destination.

Car objects. A car object is associated with a single car and has the following properties:
Car identifier (car ID);
Car owner;
If car carries cargo the type of cargo;
If car is empty the customer identifier that has requested the car to be moved;
Origin;
Destination; and
Route between origin and destination.

Normally, train objects that represent incoming trains will cease to exist when the train arrives at the hump switch yard 10 since the train is dismantled. An exception to this is a situation where the incoming train transits through the hump switch yard 10 in which case it remains intact. Departing trains are represented by train objects that begin their existence at the hump switch yard 10, having been assembled from cars that originate from one or more dismantled incoming trains. Incoming train block objects may cease to exist if the train block is disassembled and the individual cars are used to make up other train block objects. For example a train block arriving at the hump switch yard 10 may contain cars having different destinations. For the sake of this example, say that half of the cars need to be delivered to city A while the other half to city B. In such case the train block is disassembled and the cars that go to city A are switched to form alone or in combination with other cars from a different train a new train block that will travel to city A. The cars directed to city B are switched in a similar manner. In this situation, two new train blocks are created at the hump switch yard 10, from one or more incoming train blocks. Another possibility is for train blocks to be modified, instead of ceasing to exist or beginning to exist. A train block can be modified by augmenting the train block, such as by adding to it one or more cars or diminished by removing from it one or more cars. Finally, a train block may remain unchanged such as when it simply transits through the hump switch yard 10. In such case, the train block is physically dismantled into individual cars but the switching operation is conducted such as to reassemble the original train block. Alternatively, the train block can be routed directly to the departure tracks 17 such as to circumvent the switch 24.

As far as individual car objects, they remain unchanged as they transit through the hump switch yard 10.

The DTA controller 46 receives from the SRS component 30 data that describes the incoming trains so that the DTA controller 46 can determine the details of the rolling stock to be processed. The DTA controller 46 also receives information on the departure trains that the hump switch yard 10 is expected to assemble.

In a specific example of implementation, the DTA controller 46 receives form the SRS component 30 the following information:
The trains scheduled to arrive to the hump switch yard 10. The SRS component 30 simply provides the identity of the train (the train ID);
The trains that the SRS system expects the hump switch yard to make. The SRS component simply provides the identity of the train (train ID).

Once the DTA controller 46 is made aware of incoming trains and the requirement to build departure trains, the train ID information allows the DTA controller 46 to determine all the necessary information down to the individual car. More particularly, the train ID allows determining the properties of the train object and the properties of the train block objects derived via the train object and the properties of the car objects derived via the train block objects. This data will then allow the DTA controller 46 to compute switching solutions.

It should be expressly noted that the above description of the manner in which information is provided to the DTA controller 46 is strictly an example and should not be constructed in any limiting manner. Many different ways to deliver information to the DTA controller 46 exist that allow characterizing the incoming trains and the departing trains without departing from the spirit of the invention.

The various functions and features of the DTA controller 46 according to a non-limiting example of implementation will be described below in conjunction with the process flowchart in FIGS. 6 and 7. The flowcharts include a decision tree that allows the DTA controller 46 to find car switching solutions based on specific cases. It is to be expressly noted that the following description is provided only as an example of the operation of the DTA controller 46 and should not be used in a manner to limit the scope of the present invention.

Generally speaking, the DTA controller 46 implements an iterative process that periodically computes car switching solutions. Those solutions are of temporary nature in the sense that they are re-computed at each iteration cycle. The switching solution is frozen in time when the car is committed for switching. A car that is being pushed over the hump up to the hump crest 18 is considered committed for switching. Generally, a car is "committed for switching" when it is close enough to the switch 24 such that the condition of the hump switch yard 10, in other words the parameters that determine or influence the switching solution computed by they DTA controller 46 are unlikely to change significantly until the actual switching event occurs. In other words, the latest switching solution in existence when the car has reached a position in the hump switch yard 10 where it is "committed for switching" is likely to remain valid until the car is actually switched since the events and conditions in the hump switch yard 10 are unlikely to change in an appreciable manner during the time frame the car transits from the position "committed for switching" to the switch 24.

Figure 6:
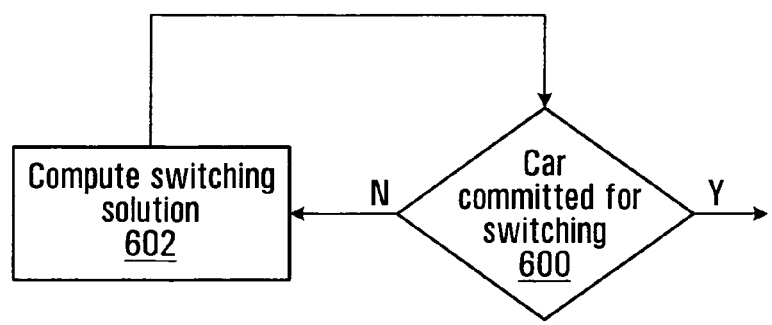
FIG. 6 is a flowchart illustrating an iterative process for computing car switching solutions according to a non-limiting example of implementation of the invention.

The flowchart on FIG. 6 illustrates generally the iteration cycle. The process enters the decision block 600 where the DTA controller 46 determines if the car is committed for switching. In the affirmative, the previous solution (the flowchart assumes that a previous solution has been computed) is maintained. In such case, this solution can be presented to the yard master of the hump switch yard 10 as being the final solution.

If the car is not yet committed for switching, the process continues to step 602 which computes a switching solution which is either an updated solution or a first solution for this car. The solution is stored by the DTA controller 46 and will be used as a final solution if, during the next iteration cycle, the car is found to be committed for switching. The process then loops back to decision step 600 and it is thus continuously repeated.

When the switching solution computation step 602 is invoked it will process information to select a classification track 16 for each car or block of cars to be humped. Cars are humped in a given sequence which typically is the sequence in which they arrive at the hump switch yard 10. In general, the track assignment logic that is implemented by the switching solution computation step 602 has the following characteristics. It is to be expressly noted that the characteristics discussed below are not to be considered limiting as they may change without departing from the spirit of the invention. In particular, a system that omits a particular characteristic, uses an altered characteristic or implements a new characteristic should not be considered outside the scope of the invention:

1. Expected Switch Time in Computing Switching Decisions.

The switching solution computation step 602 uses as a basis for finding a switching solution for a given car, the expected switch time for that car. This roughly represents the time at which the switching solution computation step 602 expects the car to be switched. The switching solution will vary with the events and conditions of the hump switch yard 10 at the expected switch time. For example, if the expected switch time is prior the time the train is scheduled to depart then the switching solution will attempt putting the car in a classification track such that it can be made part of the train. On the other hand, if the switch time is after the departure time of the train then it will be plain that different options need to be considered since that particular train is no longer available.

The expected switch time is an approximation that takes into account one or more factors, as it will be discussed later in connection with a specific example.

2. Dynamic Classification Track Assignment

Figure 5:
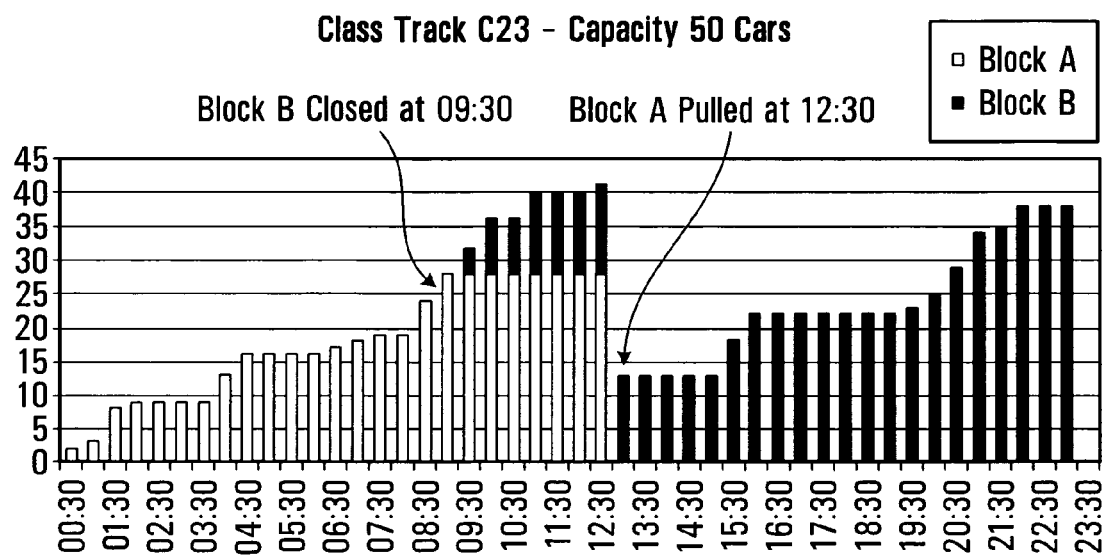
FIG. 5 is a graph illustrating the process of allocating two separate train blocks of cars to a single classification track.

Switching solution computation step 602 dynamically assigns classification tracks to train blocks. By "dynamic" is meant that the classification tracks are not constrained to certain destinations or trip plans. In other words, at some point a classification track may be assigned to train block that goes to destination A and sometime after the train block is completed or pulled, the same classification track is assigned to a train block that goes to destination B. A consequence of the dynamic classification track assignment is that a classification track may contain two or more blocks having different destinations, in other words they are associated with different departure trains. In this example, the train blocks are in order of their time of departure. The train block farther from the hump 16 departs before or at the same time as the train block closer to the hump 16. FIG. 5 shows this characteristic in greater detail. The graph shows a single classification track having a total of 50 cars capacity and the number of cars that are assigned to the classification tracks at different times. Initially, only cars that belong to train block A are being assigned to the classification tracks. Train block A is closed at 9:30. The closure occurs either because the train block is complete (all the cars that originally form part of the train block have arrived on time and are delivered to the classification track) or closed prematurely by the DTA controller 46. At about 9:30 cars from train block B are delivered to the classification tracks. At 12:30 train block A is pulled out of the classification tracks and only cars from train block B remain. This example illustrates a situation where cars that belong to different train blocs simultaneously reside in the same set of classification tracks. By adequately controlling when the first train block (the one farthest from the hump 16) closes and the respective pull times of the train blocks (the train block farthest from the hump 16 is pulled at an earlier time than the train block closest to the hump 16), the process can be adequately managed without creating a conflict such that a car or a train block in the classification tracks is prevented from being pulled out by a car or a train block of cars having a latter pull time.

In the above example, train blocks A and B are part of a different train.

3. Car Arrival Time Considerations

When determining if available space exists in a given classification track the DTA controller 46 will take into account the arrival times (ETA) of the various cars in the hump switch yard 10.

4. Pull Time Considerations

When determining if available space exists in a given classification track the DTA controller 46 will take into account the time at which one or more of the cars that are presently switched in the classification track or scheduled to be switched therein will be pulled to make up space.

5. Multiple Classification Track Assignment Modes.

Optionally, the DTA controller 46 has the capability to accept static assignments in connection with one or more of the classification tracks 16. A static assignment can be maintained permanently or semi-permanently and it associates the classification track 16 with a departure train having a given destination. Such static assignments, if used, would normally be programmed in the DTA controller 46 in a manner to allow the switching solution computation step 602 to take this factor into account when computing switching solutions. The static assignments can be specified to the DTA controller 46 via the user interface 53 by the yard master. For example, the yard master of the hump switch yard 10 may decide that one or more specific classification tracks will be dedicated for the next 12 hours to cars on the train going to Toronto. Via suitable inputs on the user interface 53 the track identifier(s) is entered and the destination associated with that track(s) as well or any other suitable parameter. When the switching solution computation step 602 sees a car to be switched that is directed to a destination other than Toronto, it automatically discounts the statically assigned classification track(s). On the other hand, should a car present itself that goes on the Toronto train, then the switching solution computation step 602 will consider the statically assigned classification track(s) for that car. The system can be designed to handle static assignments in a rigid manner such as for instance, direct cars that go to a destination to which one or more classification tracks 16 are statically assigned only to those classification tracks. Another option is to use some degree of flexibility in that the static classification tracks are considered first and if no space is available, then the cars are allowed to use a classification track having a dynamic assignment. The static assignment can be removed in the same fashion as it was applied, namely through the user interface 53.

The DTA controller 46 holds in its machine readable storage media a representation of the status of each classification track 16. This may be in the form of any suitable machine readable file stored in the memory 49 (shown at FIG. 4). The file contains the identifiers of the various classification tracks and a reference for each classification track as to whether it is to be used for dynamic assignment or for a static assignment. When used for a static assignment the file may also specify certain characteristics such as the destination the classification track is to be assigned to, and any other parameter that may be useful. Another such parameter is the time frame during which the static assignment is maintained. In such instance, the yard master enters the end points of the time frame during which the static assignment is to be maintained along with any other suitable parameters. The end points would normally be the beginning of the time frame and the end of the time frame. When the time frame expires the DTA controller 46 may automatically switch the classification track 16 to the dynamic assignment mode, may issue an alert to the yard master or do both, in other words automatically switch the assignment mode and issue a notification such that the yard master is made aware of the event.

When the yard master changes classification track assignments via the user interface 53, the changes are reflected in the file such that during execution of the switching solution computation step 602 the logic will be made aware of the correct assignment of each classification track 16.

Finally, note that assignments can be specified via the user interface 53 on the basis of classification track groups instead of being done on a single track basis. For instance, referring back to FIG. 1, the yard master may simply specify the assignment of an entire five classification track group.

6. Classification track grouping. This notion can be implemented in hump switch yards 10 where the classification tracks are physically arranged into groups, as shown for example in FIG. 1. The logic implemented by the DTA controller 46 is designed such that a departure train that is to be assembled will be assigned a most preferred group of classification tracks 16 and a second most preferred group of classification tracks 16. In other words, the cars that go in the train will be preferably put in the classification tracks of the most preferred group. If there is no space in the most preferred group, the second most preferred group will be considered. Optionally, a third most preferred group can also be used, such as to provide classification track space when the second most preferred group is full.

The notion of a preferred group avoids scattering the train blocks for a given departure train all over the classification tracks. The logic of establishing a preferred classification track group is to try placing as many of the train blocks as possible that belong to the same train in the fewest possible classification tracks that are physically close to one another. This simplifies the train block pulling operation by comparison to a situation where the train blocks are scattered over many classification tracks that may be physically remote from one another.

Preferably, the most preferred set of classification tracks and the second most preferred set of classification tracks are physically close to one another such as to simplify the train block pulling operations. The hump switch yard 10 shown in FIG. 1 illustrates two groups of classification tracks and one of those could be designated as a most preferred while the other as the second most preferred. Thus, the most preferred group and the second most preferred group are immediately adjacent to one another. The same logic can also be followed in connection with the third most preferred group, in that it can be selected such that it is close to the most preferred and second most preferred group and preferably immediately adjacent thereto.

It is important to appreciate that the notion of preferred groups is not restricted to switch yards, either hump yards or flat yards that have physical groups of the type shown in FIG. 1. Even when the classification tracks 16 are not physically grouped, they can still be logically associated into groups. In such case, groups can be defined by assigning two or more adjacent classification tracks to a group, either most preferred, second most preferred, etc.

Generally, groups of classification tracks are associated with departure trains. Once a preferred group has been established, either a physical group or a logical group, that group is maintained until all the cars scheduled to depart have been delivered in the classification tracks. After that, the association between the classification track groups and the train is dissolved, in other words groups can be assigned to a new train to be built.

It should be noted that the classification track groups do not need to be completely empty of cars before being assigned to a new train. The assignment process is essentially a logical step and a re-assignment can occur as long as there is space in the group to receive cars for a new train. The two following situations can arise:

- The group is closed to cars that belong to a new train as long as no more cars that belong to the current train are scheduled to arrive in the group. Once all cars have arrived, the group of classification tracks can begin receiving cars associated with the new train.

- The group is open to cars from a new train as long as there is space for the cars on any one of the classification tracks that make up the group. This implies that cars for the current train can still be received in any other classification track of the group. Consider for example classification track group made up of 10 tracks. Track 9 holds a train block of cars that is complete. The other tracks 1-8 and 10 hold train blocks that are still incomplete. The entire group can now be assigned to a new train since cars for the new train can be placed in track 9, while cars for the current train are still arriving in the other classification tracks of the group. In this example, the group is assigned during a certain time period to two different trains.

- The DTA controller 46 holds in its machine readable storage media a representation of the different classification track groups, specifically, identifying which classification tracks belong to which group and which departure train is currently assigned to which classification track group. In the case of a physical grouping of the type shown in FIG. 1, the identification of the classification tracks with relation to the groups will likely be the same as the physical layout and unlikely to change over time. However, in instances where no physical groupings exist, the number and identity of the classification tracks that make up the groups can dynamically change. The assignment of a given classification track group (most preferred, second most preferred, third most preferred, etc.) can be done manually by the yard master This operation is effected via the user interface 53 or can also be done automatically 7. Non-Preferred Classification Track Groups.

In selecting which classification track groups to assign to a departure train as most preferred, second most preferred, third most preferred etc, there is a possibility, as discussed in the previous example, to co-assign the same group of classification tracks to different trains. In such, case consideration is given to the relationship between the departure times of the trains. Classification track groups will not be co-assigned to trains that depart at times that are close to one another in order to avoid a potential congestion on the tracks. Such congestion is likely to arise if train blocks for different trains are pulled at about the same time from the same group of classification tracks.

8. Rehumping for Pull Time.

Cars to be switched to classification tracks may be sent to the rehump tracks 26 when the departure time of the train block to which they belong is far away. This avoids a situation where a few cars may train block a classification track for a long time period necessary for all the other cars that belong to the train block to arrive. In this case the buffering function of the rehump tracks 26 can be put to use. The decision to temporarily put cars on the rehump tracks takes into account the following factors, individually or in combination with one another:

a. The pull time of the train block. For example if the train block is to be pulled many hours away, it is a good candidate for rehumping;

b. The size of the train block. If the train block is small, say a few cars, it is possible to allow all the cars that belong to the train block to accumulate in the rehump tracks 26. Then the cars of the entire train block are humped and placed in the appropriate set of classification tracks;

c. The rate at which the cars of a given train block arrive. Even if the train block is large and may not be contained entirely in the rehump tracks, at least some of the cars that arrive first can be held temporarily in the rehump tracks until space is available in any set of classification tracks. At this point, the cars stored in the rehump tracks can be humped in the selected set of classification tracks and the remaining cars that make up the train block are directed to the selected set of classification tracks.

9. Rehumping for Arrival Rate.

Cars to be switched to classification tracks may be sent to the rehump tracks 26 when they arrive at a very slow rate. This could occur in connection with a given train block and where the first few cars of the train block arrive very slowly. Those cars can then be directed to the rehump tracks and held there until the rate of arrival of the cars for that train block increases, at which point the cars are switched into classification tracks.

10. Preemptive Closure of a Train Block.

If a train block is kept open for a long time period, cars that belong to other train blocks may have to be sent to the rehump tracks. Rehumping cars consumes resources which translates into additional operational costs. When a large number of cars may need to be rehumped, it may make more sense to close the train block and thus open space on the classification tracks. When a train block is prematurely closed, the cars arriving post closure that were intended for the closed train block need to handled somehow. For instance the late cars can be assembled into a new train block.

11. Empty Car Substitution.

Empty cars, are associated with a trip plan, as any other railway car. To improve the overall car switching process at the hump yard 10, empty car (a car that does not carry cargo and is directed to a location to pick up a shipment) substitution can be implemented where a given empty car that is currently available for switching can be substituted for another empty car that may be late or unavailable for switching. In addition to the physical car substitution, the records in the SRS component 30 are updated to indicate that the first car (the car that is available) has now taken the place of the second car (the unavailable car) in the trip plan of the second car.

The exemplary characteristics outlined above will be better understood with relation to the following specific examples. It should be expressly noted that characteristics are provided as examples and should not be interpreted as being essential to the invention in any way.

Figure 7:
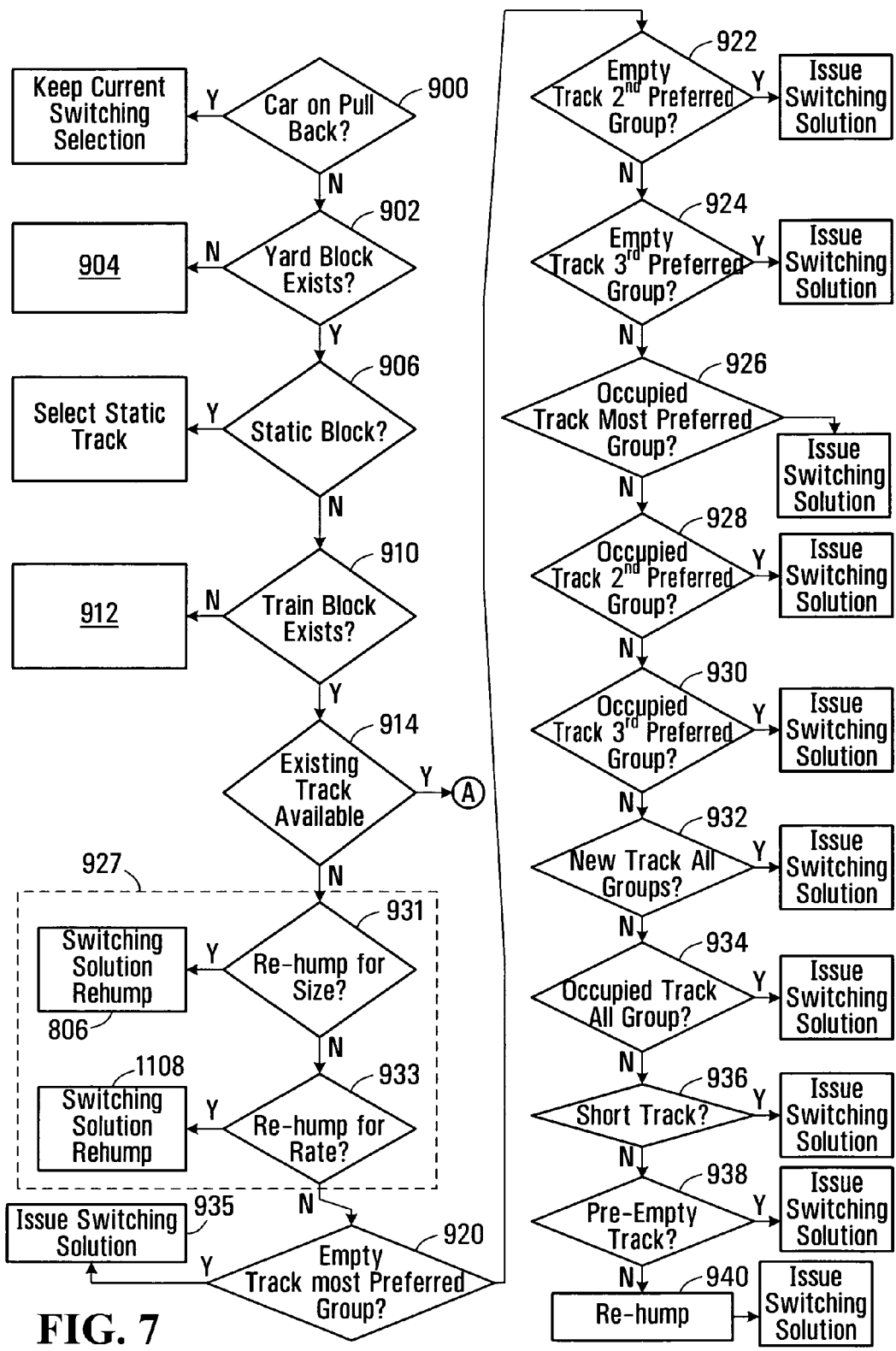
FIGS. 7 and 8 are more detailed flow charts of the general process illustrated in FIG. 6.

FIG. 7 is a high level flowchart of the logic that is implemented by the DTA controller 46 to switch cars, in particular the step 602 shown at FIG. 6. The decision tree represented by the flowchart is followed sequentially. If at anyone of the steps a switching solution is found the car is switched and the process terminates. If no solution is found at a particular step the process continues to the next step.

The process starts at 900. At that decision step the DTA controller 46 determines if the car is on "pull back". A car on "pull back" is a car that is currently in position to be pushed over the hump 20 (or being in position at the hump 20); therefore it is committed for switching. Accordingly, if the decision step 900 is answered in the affirmative any previous switching solution computed for this car by the DTA controller 46 is presented as final solution over the user interface 53 (step 901). If this assessment is answered in the negative the process continues at step 902 that determines if the yard block to which the car is assigned exists. This is effected by looking at the data made available to the DTA controller 46 from the SRS component. This data includes information about the yard blocks in the hump switch yard 10. If no yard block exists for the car, in other words the decisions step 902 is answered in the negative the car is sent to rehump at step 904. Once in the rehump tracks the car will be periodically rehumped and the above described processing done again. If at this time a yard block for the car is found then the process would branch to decision step 906.

Decision step 906 determines if the yard block to which the car is assigned is a static train block. A static train block is a train block that is associated with a static classification track. As discussed earlier, a static classification track is one that may be assigned to cars or train blocs associated with a departure train going to a predetermined destination. Accordingly, if the decision step 906 is answered in the affirmative, the switching solution is determined by consulting the representation of the classification tracks in the DTA controller 46. As previously indicated, this representation provides information on the statically assigned classification tracks and details about such assignment, in particular the destination of the blocks put on those classification tracks.

As discussed earlier, a static classification assignment can be done via the user interface 53.

If no static classification track 16 has been assigned for the car, the process continues to step 910 that queries if a train block exists for the car. This determination takes into account the expected switch time of the car. If an outbound train cannot be found that carries the train block, then it is not possible to perform a dynamic track assignment. The car is therefore directed to a rehump track 24 (step 912).

The computation of the expected switch time for a given car is an approximation of the time at which the car is expected to be available for switching. Several factors can be used in making this determination, for example:

a. The number of cars that are presently in the hump switch yard 10 and that are yet to be switched;
b. The rate or arrival of cars in the switch yard;
c. The rate at which cars are switched;
d. Resources available to prepare the cars for switching.

Factor (a) and factor (b) allow determining, at any given time, how many cars will be in the queue awaiting switching. Recall that this information is readily available to the DTA controller 46 from the SRS component 30. Factor (c) can be a rate computed on the basis of the operations in the hump switch yard 10 that occurred in the past couple of hours. For example, a car switching rate can be computed on the basis of the number of cars switched in a given time frame, say the last two hours. A car switching rate can also be computed theoretically by taking into account resources available (factor d) in the switch yard to perform the operations necessary to prepare the cars for switching. One such operation is the mechanical inspection of the cars. One such resource is the number of crews that can perform the preparation for switching, namely the mechanical inspection. By considering the average number of cars that a crew can mechanically inspect it is possible to compute the rate at which cars can be made available for switching. Another possibility is to take into account the rate computed on the basis of switching activities that have occurred in the past previous hours and adjust it to take into account variation in the number of crews, for instance increase the predicted rate if the number of crews increases or decrease the rate if fewer crews will be available.

The DTA controller 46 can on the basis of the above factors determine for a given car, the number of cars that precede it in the humping queue. Then on the basis of the switching rate, an expected switching time for the car can be computed.

Note that the expected switching time for the car can remain static or can be periodically updated, such as at each iteration cycle where a new switching solution is computed. A static expected switching time is a time that once computed is re-used at every iteration cycle. In contract, the expected switching time can be re-computed periodically as the car moves up through the queue of cars that are to be switched. In this fashion, a more precise approximation can be obtained. The period at which the expected switching time is re-computed can vary. One possibility is to do it at every iteration cycle at which a switching solution is computed.

At decision block 914 the process determines if there is an existing classification track for the train block to which the car belongs. This query will be answered in the affirmative if the car is not the first car of a train block. In other words, a classification track has already been assigned to the train block. On the other hand, if the car is the first car of the train block then the query will be answered in the negative. If this query is answered in the affirmative, in other words the car is not the first car in the train block and a classification track 16 has already been assigned to this train block, then the process continues to step 916 shown at FIG. 8. Step 916 determines if the car will in fact fit the classification track assigned to the train block. As it will be described below, in principle there should be enough space on the classification track 16 assigned to the train block since when the first car of the train block is switched, the switching solution that determines which classification track will receive the car, not only looks for space for that particular car, but also for space for cars that belong to the train block and that will be subsequently switched. This will be described later. So while in principle space should be available, the step 916 still tests for available space to take into account some special factors. For instance, there may be situations when more than one classification track may have been assigned to the train block in which case, the process will determine which classification track is the best candidate for receiving the car. In such case, the DTA controller 46 will determine the space available in each assigned classification track 16. For the sake of this example, assume that two classification tracks 16 have been assigned to the train block. if not enough space is available in one of the classification tracks 16 and space is available in the other classification track 16, the DTA controller 46 will compute a switching solution directing the car to the classification track 16 having the requisite space. On the other hand, if space is available in both classification tracks 16, the DTA controller 46 will compute the best fit, in other words it will chose as a solution the classification track 16 that will leave the least amount of free space when the car is switched to it.

When the step 916 is executed, the classification track 16 that is tested for available space is retrieved from the memory of the DTA controller 46. In other words, when a classification track is assigned to the first car of a train block, the relationship between the train block and the classification track is stored in the memory of the DTA controller 46. When subsequent cars for that train block arrive and are to be switched, the DTA controller consults this information to determine which classification track 16 has been assigned to the train block and will then test for available space there.

If the decision block 916 is answered in the negative, in other words no space is available for the car in the classification track(s) assigned to the train block, then the processing continues with an overflow logic thread that aims to find a place for the car on another classification track. The logic overflow process is shown by bloc 917. This logic is generally similar to the process starting at step 922 and ending at step 940. Those steps will be described in greater detail later.

If decision bloc 916 is answered in the affirmative, the process continues with decision bloc 919 which determines which departure train the car will be directed to. Step 919 is an option that is useful in circumstances when the car has an expected switching time close to the pull time of the block. In other words, it may not be fully known at the time the switching solution is computed if the car can make the classification track before the pull time of the block. By default, the logic of the DTA controller 46 is designed such as to try fitting the car on the earliest departure train. So, the logic will compute switching solutions that put the car in a train block having a departure time close or slightly before the expected pull time (the extent of what constitutes "close" or "slightly before" is programmed in the DTA controller 46 and can be in its simplest for predetermined time periods). In some cases, the pull time may be delayed and the car will in fact make the current train. Similarly, the actual switch time of the car can occur slightly before the expected switch time in which case the car will also be able to make the current train.

In short, as long as the expected switching time is close enough to the pull time of the current block the DTA controller 46 will compute switching solutions (step 921) that put the car with train block scheduled to depart shortly. Only when the spread between the expected switching time and the pull time exceeds a threshold or the current block is actually pulled or for some other reason it becomes obvious that the car cannot make the train scheduled to depart shortly, then a different switching solution is computed (step 923) that puts the car in a train block with a latest train. The label in FIG. 8 "same day train?" assumes that a departure train leaves every day. Hence, if the car does not make the current train, it will be put at step 923 at on the next day train.

Figure 10:
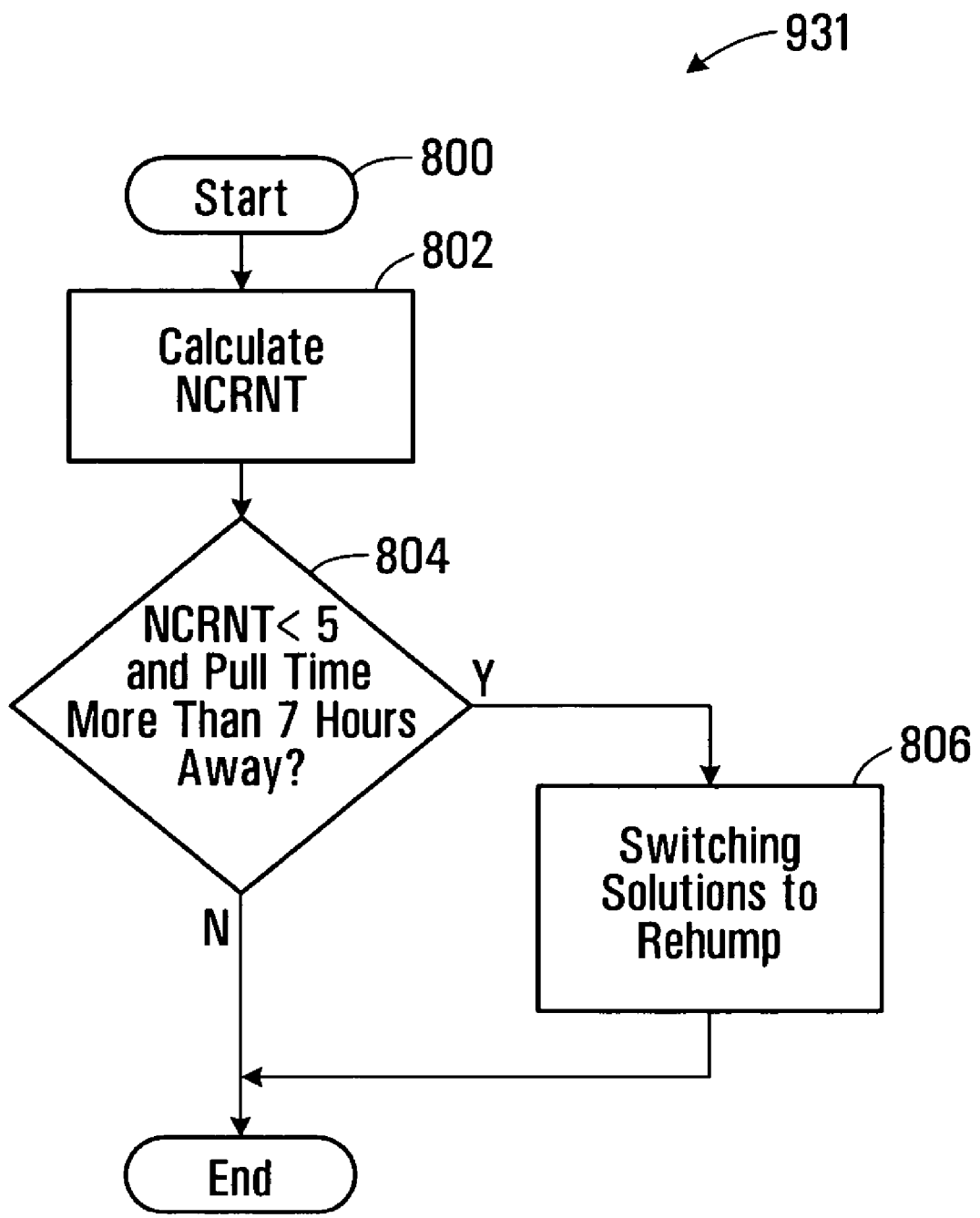
FIG. 10 is a flowchart illustrating a logical process for determining if a car should be rehumped based on small train block size.

Referring back to FIG. 7, if decision step 914 is answered in the negative, in other words no classification track has been yet assigned to the car because this is the first car of a train block, than the processing branches toward a series of steps that will first determine if it suitable to buffer this car instead of immediately switching it. The buffering process, identified by the reference numeral 927 includes a first decision step 931. That decision step assesses the desirability of temporarily putting the car, and perhaps the following cars that belong to the same train block, in the rehump tracks 26. Generally, it is desirable to limit as much as possible the amount of time cars from a train block reside on the classification tracks 16 since the space that is occupied by the cars cannot be used for any other purpose. This problem may arise when the cars that make up a train block progressively arrive at the hump switch yard 10 over a long time period. For instance, when a first car is delivered, a switching decision is made and space is reserved for the entire train block on the classification tracks 16. That space, therefore, cannot be used for other purposes until the last car of the train block arrives, which may be many hours away. A possible approach is to use the rehump tracks 24 as a temporary buffer and thus free space on the classification tracks 16. This option can be implemented when certain conditions are met. Train block size is one those conditions. It is desirable to put the car in the rehump tracks 24 when the overall size of the train block is small. If the determination at step 931 indicated that the size of the train block to which the car belongs is small, among other conditions discussed below, the DTA controller 46 will compute a switching solution according to which the car is directed to the rehump tracks 26. FIG. 10 is a flowchart of the process steps that take place under step 931.

The process starts at step 800. At step 802 the Number of Cars Remaining for the Next departing Train (NCRNT) for a given train block is computed. The NCRNT is the number of cars for the train block that have an expected switching time before the scheduled pull time of the train block. NCRNT takes into account cars that are presently in the hump switch yard 10 and also cars that have not yet arrived but have an ETA such that their expected switching time will still occur before the train block pull time. The DTA controller 46 receives information on the various parameters necessary to compute NCRNT from the SRS component 30, such as information on the identity of the train block and its characteristics, as well as the ETA of the cars that make up the train block. The DTA controller 46 can compute the expected switching time for each car as described earlier and on the basis of the expected pull time of the train block that is also available or derived from information in the SRS component 30, the NCRNT value is computed.

At decision step 804 the DTA controller 46 determines whether a car will be switched to classification tracks 16 or to the rehump tracks 26. The decision is based on the computed value NCRNT and the pull time of the train block from the classification track 16. In the specific example of implementation, if NCRNT is relatively small, less than 5 cars and the pull time of the train block is more than 7 hours away then a switching solution is computed to put the car in the rehump tracks 26 (step 806). Otherwise, the DTA controller 46 proceeds to step 933 in FIG. 7. The specific parameters in this example should not be interpreted in a limiting manner since those parameters can widely change without departing form the spirit of the invention. Specifically, For instance, the NCRNT parameter can be increased to more than 5 cars when the rehump tracks 26 have a lot of space and can accommodate a significant number of cars. The 7 hours period can also be altered without departing from the spirit of the invention.

Figure 11:
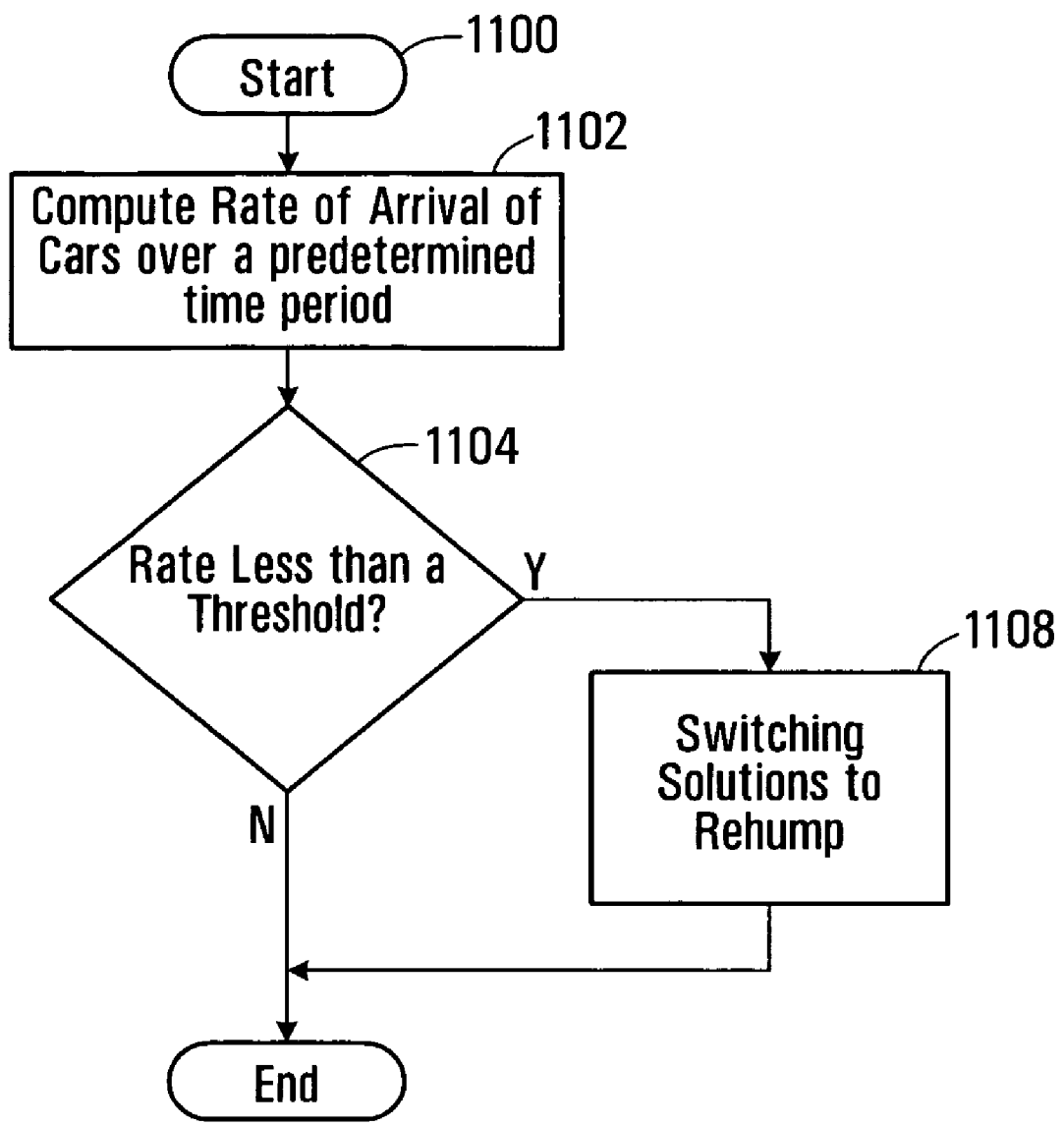
FIG. 11 is a flowchart illustrating a logical process for determining if a car should be rehumped based on arrival rate.

Decision step 933 tests for another condition that may result in the car being sent to the rehump tracks 26. This condition is the rate of arrival of cars at the switch 24. If the rate is low, i.e., the cars making up the train block will have respective expected switching times spread over a long time period, then it is advantageous to temporarily place the car on the rehump tracks before switching the car in any one of the sets of classification tracks 16. The flowchart of FIG. 11 illustrates this process.

The process starts at step 1100. At step 1102 the rate of arrival of cars for the train block is computed. This rate is established by determining the number of cars that will be present in the hump switch yard 10 over a predetermined time period, say the next 5 hours. The number of cars is the sum of the cars presently in the hump switch yard 10 and those that are scheduled to arrive within the predetermined time period. As with the previous example, this information is made available to the DTA controller 46 from the SRS component 30. Decision step 1104 determines if the rate of car arrival is above or below a threshold. For example the threshold may be five cars. So if the rate is five cars or more in the next five hours, step 933 is answered in the negative. Otherwise, if the rate is less than five cars in the next five hours, then a switching solution to rehump the car is issued at (step 1108). It will be appreciated that the specific values provided are merely examples and they can be widely vary without departing from the spirit of this invention.

Note that the rate of arrival factor may also be refined by computing the expected switching times of the cars making up the train block instead of the looking only at the number of cars of the train block presently in the hump switch yard 10 and the ETA of the cars that have not yet arrived.

Assuming now that the decision step 933 is answered in the negative, in other words the conditions that would trigger a rehumping solution have not been met, the process continues with decision step 920. In most cases, when the processing reaches this step the car for which a switching solution is being computed is the first car for a train block. Generally, the computations for finding a solution are more complex than in the case when subsequent cars are switched since the DTA controller 46 is not only looking for space for the first car but is also reserving space for the subsequent cars of the train block.

Step 920 first looks for an empty classification track in the preferred group. When several empty classification tracks are available within the preferred group, one option is to randomly choose one. This is suitable when all the empty classification tracks have the same capacity, in other words each empty classification track can accommodate the same number of cars. When empty classification tracks with different capacities are available an option is to choose the one that best fits the train block. In this context "best fit" means a classification track that will contain the least amount of empty space when the entire train block will be delivered in the classification track. The "best fit" computation can be done for each empty classification track by subtracting the train block size from the track capacity. This computation can be made in terms of number of cars or in terms of cumulative car length to take into account cars having different lengths. If an empty classification track is found at step 920 a switching solution is computed (step 935). Otherwise the process continues at decision step 922 which is the same as decision step 920 except that the search for an empty classification track is done in the second most preferred classification track group. Again, if no solution is found at step 922, step 924 performs the same operation, this time looking for an empty classification track in the third most preferred classification track group.

If anyone of the decision blocks 920, 922 or 924 is answered in the affirmative, in other words an empty track is found for the train block, the DTA controller will make an entry in the records in its memory 49 such as to associate the selected classification track with the particular train block. Such association is made by marking the selected empty classification track as "opened" and marking all the other classification tracks as "closed" as far as that train block is concerned. As indicated above this is done by writing the appropriate data in the computer files or records that the DTA controller 46 processes to perform its management functions. Accordingly, when switching solutions are computed for any subsequent cars of that train block, all classification tracks that are marked "closed" are disregarded and the search for switching options is constrained to the "opened" classification track.

Referring back to step 914, which is looking for an existing track for a train block, the "closed" or "opened" status of the classification track allows the DTA controller 46 to identify the correct classification track that is to receive the car.

Once a classification track is marked as "opened" in connection with a certain train block, that classification track is also marked as "closed" for any other train block. This ensures that the classification track will receive only cars for the relevant train block.

The "open" status of a classification track is negated when the switching solution for the last car of the train block has been computed. In other words, the train block is now complete. Similarly, the "closed" status of the classification track with regard to any other train block is also negated, thus allowing cars of another train block to be directed to the classification track.

If no switching solutions have been found at anyone of the steps 920, 922 and 924, indicating that no empty tracks for the train block are available in anyone of the preferred classification groups, the DTA controller 46 continues with decision step 926 that tries to find space for the train block in an already occupied track.

The process will try to find space first in the most preferred group, then the second most preferred group, then the third most preferred group before considering other options. The decision step 926 tries to determine if an occupied classification track 16 exist in the most preferred group that can accommodate the train block or a portion thereof. As discussed previously, the DTA controller 46 will consider only those classification tracks 16 that have train blocks marked "complete", hence the track is open to receive a new train block. All the other classification tracks 16 in the most preferred group that hold cars but where the train blocks are not yet complete are from a logical process point of view marked "closed". Assuming that the process locates a single occupied track with a closed train block, hence available to receive a new train block, the process will then determine if enough space exist for the new train block on the track.

In a specific and non-limiting example of implementation, the available space in the classification track equals not the currently available space on the classification tracks but the space that is made available to the new train block considering that train blocks currently occupying the set of classification tracks will be pulled at certain times in the future (train block pull profile vs. car arrival profile).

More specifically, the computation of the available space takes into account the pull time of the train block that currently occupies the track and the ETA, or expected switching time of the cars that make up the train block for which space is being sought. For instance, assume a classification track 16 having a 50 car capacity. Train block A made up of 30 cars that occupies the classification track 16 is scheduled to be pulled at noon (current time is 10:00 AM). The DTA controller 46 needs determining if there is available space for departure train block B that is made up of 40 in the same classification track 16. The arrival profile of the cars making up train block B in the classification track 16 is such that 19 cars will arrive at 11:00 AM, 5 at 3:00 PM and 16 at 3:30 PM. The computation of the available space in the classification track 16 is done at different points in time that generally coincide with the arrival of the cars making up train block B. For instance the available space at the following times will be:

11:00 AM—one car;
12:00 AM—19 cars considering that train block A was pulled;
3:00 PM—24 cars;
3:30 PM—10 cars.

By checking if available space exist at the ETA, or expected switching time of each car in the new train block, the process can determine if, enough space will exist for it in the classification track 16. The train block B is deemed to "fit" in the classification track 16 if for every train block B car that arrives, space exists to receive it.

In determining the time at which cars arrive in the classification track 16, one option is to use only the ETA of the cars available from the SRS component 30. The ETA provides a rough estimate of the time the cars would be present in the classification track since it does not take into account the preparation time for switching such as the mechanical inspection. Never the less, in some applications the ETA can provide a reasonable indication of the time the cars will arrive in the classification track 16 and as to make the assessment. Another more refined option is to use the expected switching time of the cars which is computed as described earlier.

In the case where the process finds a single classification track 16 that can accommodate the new train block then the process terminates by issuing the switching solution. However, in the instance where several classification tracks exist in the most preferred group of classification tracks that can all hold a complete train block, and that can accommodate the new train block, hence the new train block "fits" two or more classification tracks in the most preferred group, then a number of options arise that are considered by the DTA controller 46 to find the best solution. This situation is illustrated in the flowchart at FIG. 9. The process starts at 700. At step 706 the process will compute the degree of "fit" in each classification track that can hold the new block. The degree of "fit" is represented by the Left Over Room (LOR) for each classification track option. The LOR is the free space in the classification track that will remain after all the cars of the new train block cars have arrived. In the above example, the LOR at 3:30 will be of 10 cars.

Figure 9:
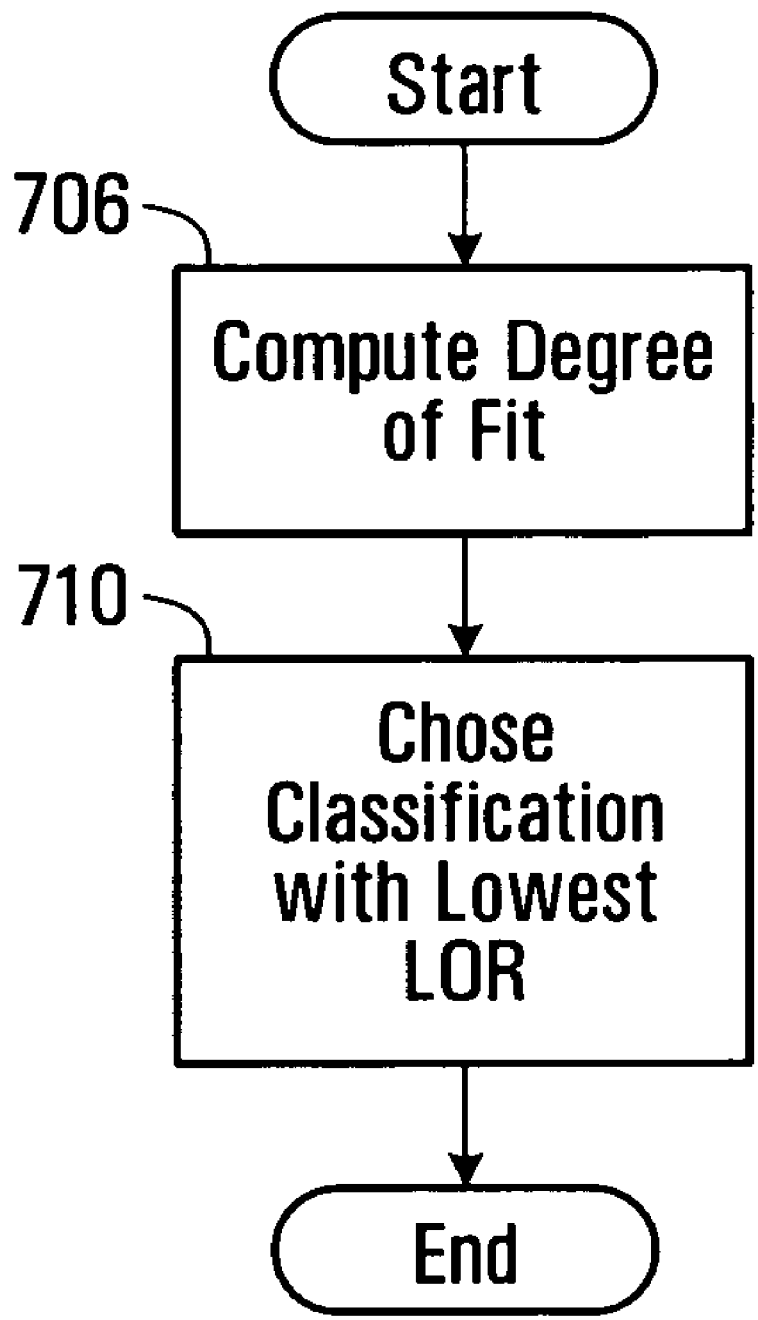
FIG. 9 is a flowchart illustrating a logical process for selecting an occupied a classification track in which to switch a car.

In FIG. 9 the DTA controller 46 will select at step 710 the classification track that has the lowest LOR and thus provides the best "fit". Since LOR is space that is difficult to use in practice, selecting the classification track with the lowest LOR results in most cases in a better utilization of the available space.

When a classification track has been found to accommodate the new train block, then the records of the DTA controller 46 are marked such that:

For every car of the new train block all the classification tracks 16 will be seen as "closed", hence not available, with the exception of the selected classification track 16. This ensures that the subsequent cars of the new train block will be constrained to go to the selected classification track 16.

The selected classification track 16 will appear as "closed" for every car that belongs to a train block other than the new train block. Again this ensures that only cars from the new train block are directed to the selected classification track 16. The selected classification track will be released from the "closed" status only when the new train block is completed, in other words all the cars from that train block have been delivered in the selected classification track 16.

Now assume, for example, that the process under step 926 in FIG. 7 fails to identify an occupied track in the most preferred track group that can hold the entirety of the new train block. The next step is to terminate process step 926 and initiate process step 928. Process step 928 is similar to process step 926 with the exception that it looks for space for the new train block in the second preferred group of classification tracks. Similarly, if no space can be found for the new train block in the second preferred group of classification tracks, the process continues to step 930 that will consider the third preferred group of classification tracks.

If no space is available in anyone of the preferred groups then the process will look for space outside the preferred groups. The same pattern described earlier will be repeated. More specifically, the step 932 will search for an empty classification track but outside the preferred groups (most, second and third). If such an empty classification track is found then a switching solution is issued. Otherwise, the process continues with step 934 that will consider all occupied tracks with closed train blocks outside the preferred groups.

Figure 12:
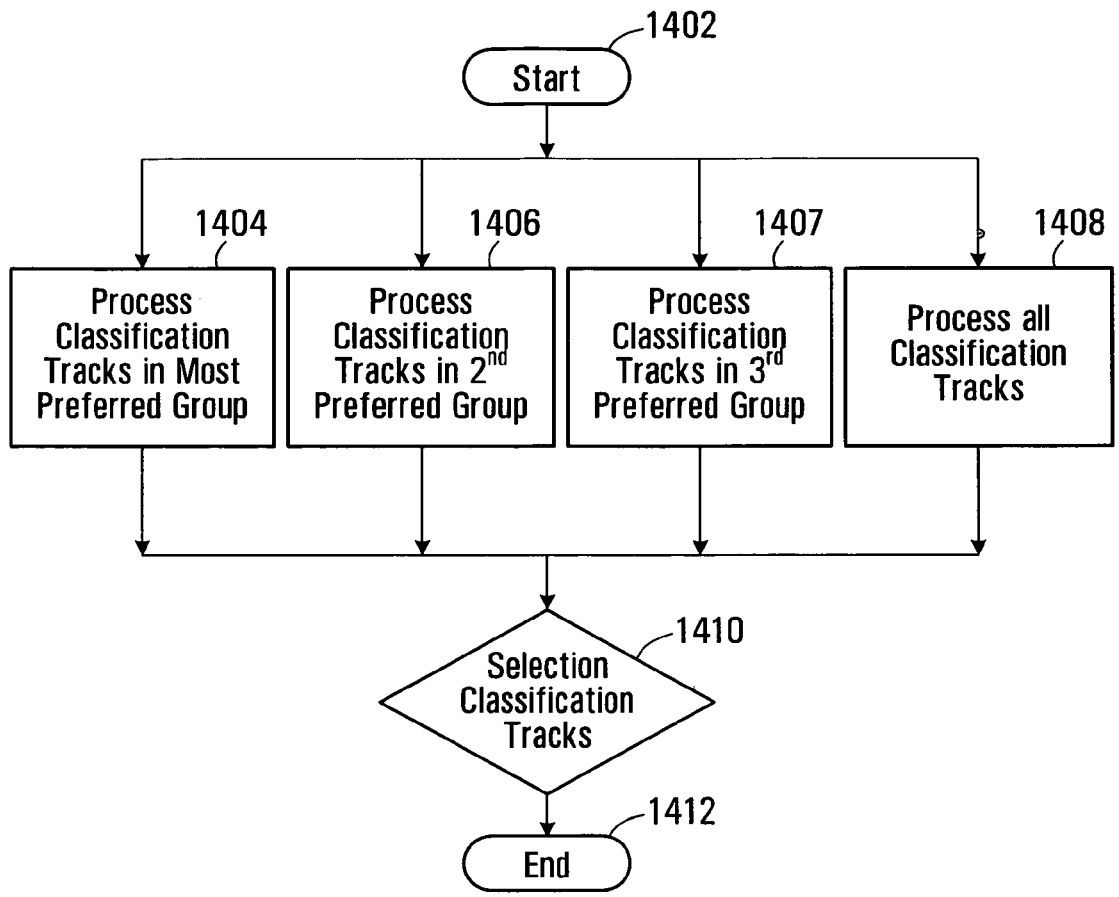
FIG. 12 is a flowchart illustrating a logical process for selecting a classification track to receive only a portion of a train block.

If no space for the train block has been found so far, the process continues with step 936 which is described in greater detail with reference to the flowchart on FIG. 12. This point in the overall process indicates that no classification track 16 exists that can accommodate the entire train block. The DTA controller 46 will now try identifying a classification track 16 that can accommodate most of the train block but not all of it.

The process starts at step 1402. At step 1404 the DTA controller 46 will compute the available space on each set of most preferred classification tracks 16 with closed train blocks (i.e. classification tracks 16 that can receive cars from another train block). Classification tracks 16 with train blocks that are still open are disregarded. The computation of the available space takes into account the pull profile of the existing train block(s) and the arrival profile of the cars of the current train block as described earlier. The result of the available space computation essentially determines how many cars will fit in each classification track with a closed train block. The DTA controller 46 retains in memory the classification track 16 that can hold the largest number of cars.

The same computation is performed in connection with the classification tracks 16 in the second preferred group (step 1406), in the third preferred group (step 1407) and then for classification tracks (step 1408) other than those in the most preferred, the second preferred group (step 1406) and the third preferred group (step 1407).

The results of the four computation operations are compared at decision step 1410. Generally, the selection logic is designed to favor a classification track according to the following order of preference:

the most preferred group of classification tracks;
the second preferred group of classification tracks;
the third preferred group of classification tracks;
Tracks that are outside the most preferred, second preferred and third preferred groups of classification tracks.

This order of preference is applied unless a classification track at a less preferred level can hold significantly more cars.

One example of decision thresholds is to select a classification track in the most preferred group unless the available classification track from the second preferred group can hold at least 5 more cars. The same or different threshold can be applied to other preference levels as well. For example the classification track returned by step 1407 (third preferred classification track) is selected if it can accommodate 10 cars or more than the classification track in the second preferred group.

Once the decision on which classification track 16 to use is made and the appropriate records in the DTA controller 46 are marked to open that classification track only to cars of the new train block and similarly close the selected classification track 16 to cars from any other train block, then a processing is initiated to determine how to handle the overflow. Several options exist:

- Direct the excess cars to rehump tracks 26. This option is suitable if the number of excess cars is low. So, for instance, a threshold could be set such that if the number of excess cars is at or below the threshold they are directed to the rehump tracks 26. In a specific and non-limiting example of implementation, the threshold could be five cars. The DTA controller 46 will then mark its records that the cars which make up the overflow are to be sent to the rehump tracks 26. For instance, each car object of the train block can be marked by the DTA controller 46 to the effect that it has only two switching options, one being the rehump tracks 26 and the other the selected classification track 16. Since the classification track 16 is full when the car arrives at the hump, the logic will direct the car to the rehump tracks 26. When the cars in the rehump tracks are humped, then the logic is run one more time and if space is now available in the selected classification track, then the switching solution to direct one or more cars in that classification track 16 is issued.
- Place the cars of the train block in two separate classification tracks. In other words, the overflow is sent to a different classification track 16 instead of waiting for space to be available in the selected classification track 16. Under this option, the train block as far as its processing by the DTA controller 46 is concerned is handled as two separate train blocks, which are to travel on the same departure train. In other words the selected classification track 16 that holds the initial part of the train block is considered to hold a closed train block, in other words no further cars are expected in that classification track 16 for the same train block. At the same time, the overflow is considered from the point of view of the DTA controller 46 logic to become a train block and it is treated as such. The logic starting from step 920 is performed to find a suitable location for that "new" train block. Since it will not be desirable to locate the overflow physically remote from the initial part of the train block, the logic may be constrained to look for space only in the most preferred classification track. Finally, the logic also needs to take into account constraints that arise at train block pull time due to the train block splitting. In particular it would be highly desirable to synchronize the train block pulling operation on the two classification tracks such that the train block parts are physically joined to one another in the departure train;
- Pre-empt the selected classification track (step 938 in FIG. 7). This option is an extension of the second option above, the exception being that two train blocks are being created out a single train block. Recall that in the previous case, the train block splitting was only an operation internal to the DTA controller 46 and the result was still a single train block, as far as the departure train is concerned. Here, a single train block creates "officially" two separate train blocks. The new train block that is made up of the overflow has essentially the same properties as the original train block, such as destination, etc, with some differences such as the number and identity of cars that make up the new train block. Moreover, the original train block also needs to change in that now it has fewer cars. Finally, the departing train object also needs to be updated, since it now contains one more train block. Those changes are handled by modifying the records in the DTA controller 46. Since the DTA controller 46 is aware of the identity of the cars making up the overflow, it will:
  - Create a new train block object to encompass the overflow by also copying relevant properties from the prior train block object (such as destination, etc.);
  - Modify the existing train block object by adjusting for the cars that have been excised and are now part of the newly created train block object;
  - Update the train object to add to it a new train block object.

All those changes must also be communicated to the SRC component 30 such that the railway operations, once the train has left the hump switch yard 10 can be conducted by taking into account the existence of a new train block. The necessary information can be communicated to the SRS component 30 manually. This can be done by an operator that will access the system and make the necessary changes. Another possibility is to allow the DTA controller 46 to communicate directly with the SRS component 30 such as to change the records of the SRS component 30.

If the step 938 is answered in the negative, in other words a switching solution is not possible, the final option is the step 940 that issues a switching solution to sends the car to the rehump tracks 24.

In the above examples, the DTA controller 46 is designed to compute a switching solution and tell the yard master or any other operator where the car should go. In this embodiment, the DTA controller 46 assists with the switching process and it is up to the yard master to validate the choices made by the DTA controller 46 and then authorize their implementation. In a possible variant, not shown in the drawings, the DTA controller 46 can be designed such as to communicate switching commands directly to the HPCS component 32. In this fashion, the DTA controller 46 will cause the HPCS component 32 to implement the switching solutions, bypassing the human operator. This system would require a communication link between the DTA controller 46 and the HPCS component 32 over which commands and data can be exchanged between both entities.

A possible variant to the general process described earlier in connection with FIGS. 8 and 9 is to provide a special treatment of empty cars in order to take advantage of the inherent flexibility they possess, in terms of being substitutable for one another. Cars that carry goods have to be switched in a way to reach the destination of the goods. In contrast, a given empty car does not need to comply with the preset trip plan. What matters from a customer's perspective is to receive an empty car; it is far less critical which specific car is being sent since any empty car (that matches the customer requirements) will do.

Figure 8:
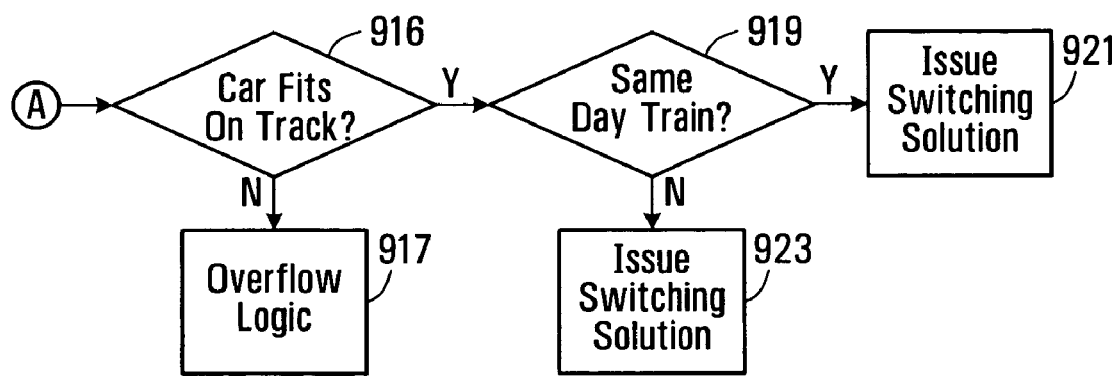
Figure 13:
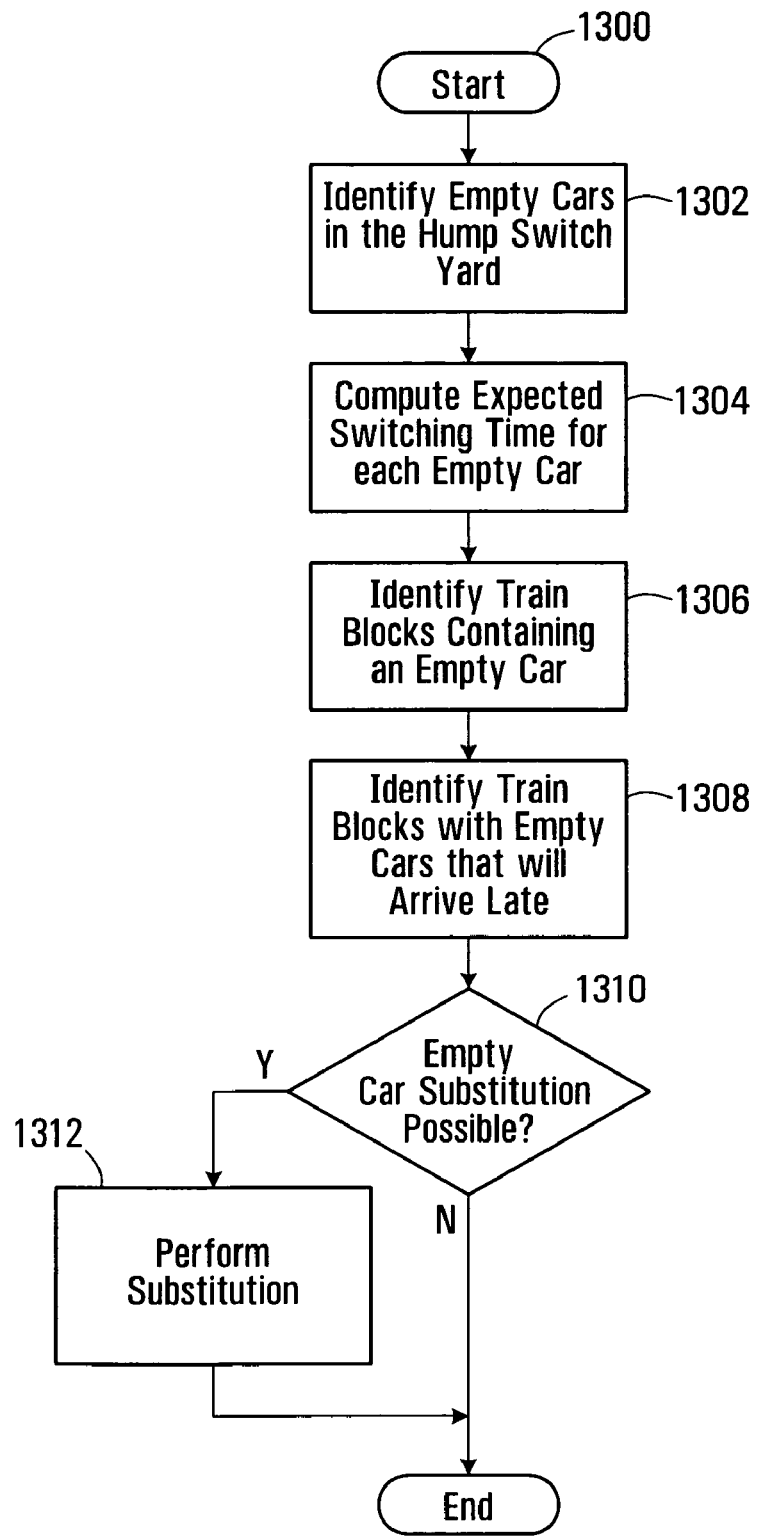
FIGS. 13 and 14 illustrate logical processes for performing empty car substitution.

In summary, the process described in FIGS. 8 and 9 treats the empty cars as any other car and they are switched as per the parameters establishing which train block they go to. FIG. 13 shows a variant where the specificity of the empty cars is recognized by the DTA controller 46 such as to perform substitutions, wherever possible.

The process starts at 1300. At step 1302 the DTA controller will identify all the empty cars in the hump yard 10. In essence the DTA controller 46 maintains in the memory 49 a list of all the empty cars that are currently in the hump switch yard 10 and that have not yet been switched. This list is continuously being updated to take into account cars that are being switched and cars that are arriving with inbound trains. Every time an empty car is switched and placed in a classification track 16 the list is updated to remove that car from the list. Similarly, every time a new train arrives, if that train contains empty cars they are added to the list.

The DTA controller 46 is capable of distinguishing between empty cars and cars that are not empty by inspecting the records associated with the respective car objects available from the SRS component 30.

The DTA controller 46 computes at step 1304 the expected switching time of each empty car in the dynamic list maintained by the DTA controller 46. The expected switching time is an information that can be added to the list or it can be cross-referenced on the basis of the car ID information. In other words, the DTA controller 46 can be designed such that it computes the expected switching time for all cars in the hump yard 10 yet to be switched and the expected switching time for the empty cars can be extracted on the basis of car ID information.

At step 1306 the DTA controller 46 will identify all the train blocks that the switch yard 10 is to make (departing train blocks) that have not yet been pulled and that contain empty cars. Again this identification is made based on the records provided by the SRS component 30. The inquiry made at step 1306 will essentially produce a list of train blocks that contain empty cars. Those departure train blocks are either in the process of being assembled or will be assembled in the future. Note that the train blocks identified at step 1306 are defined in the DTA controller 46 records in terms of specific cars making up the train blocks. In other words, a train block containing one or more empty cars specifies unique car ID numbers, not just any empty car.

At step 1308 the DTA controller 46 will determine if anyone of the specific empty cars required for the train blocks to be assembled will be available on time. Available on time means that the particular empty car has an expected switching time prior to the pull time of the block. Step 1308 is expected to produce a shorter list of blocks containing empty cars where at least one empty car specified for each block will not be available on time. This may be caused by the arrival train that brings the empty car being late. Since the DTA controller 46 is made aware of the ETA of each car via the SRS component 30 it can determine for any given car if can be switched before the pull time of the departing train block.

Decision step 1310 determines if an empty car substitution is possible. Once a block has been identified where an empty car will be late, the DTA controller 46 looks for other empty cars in the hump switch yard 10 that can be substituted to the late car. Since a list of all the empty cars in the hump switch yard 10 has been compiled at step 1302 and their respective expected switching times are known, then the DTA controller 46 can determine by searching that list if there is an empty car having an expected switching time before the pull time of the block, hence available to be substituted for the missing or late car. If a substitution is possible then the substitution is performed. This entails switching the car ID numbers in the records associated with the two cars. Specifically, the ID of the car that is currently available in the hump switch yard 10 replaces the ID of the car that is late in all the records of the DTA controller 46 and also in the records of the SRS component 30. Similarly, the ID of the car that is presently in the hump switch yard 10 is replaced by the ID of the car that is late. Hence, when the car that is late actually arrives it will be directed to the train block that was to receive the other car.

If no substitution is possible, in other words the decision step 1310 is answered in the negative, the DTA controller 46 does nothing and the situation is handled as per the process described in connection with FIGS. 8 and 9.

Figure 14:
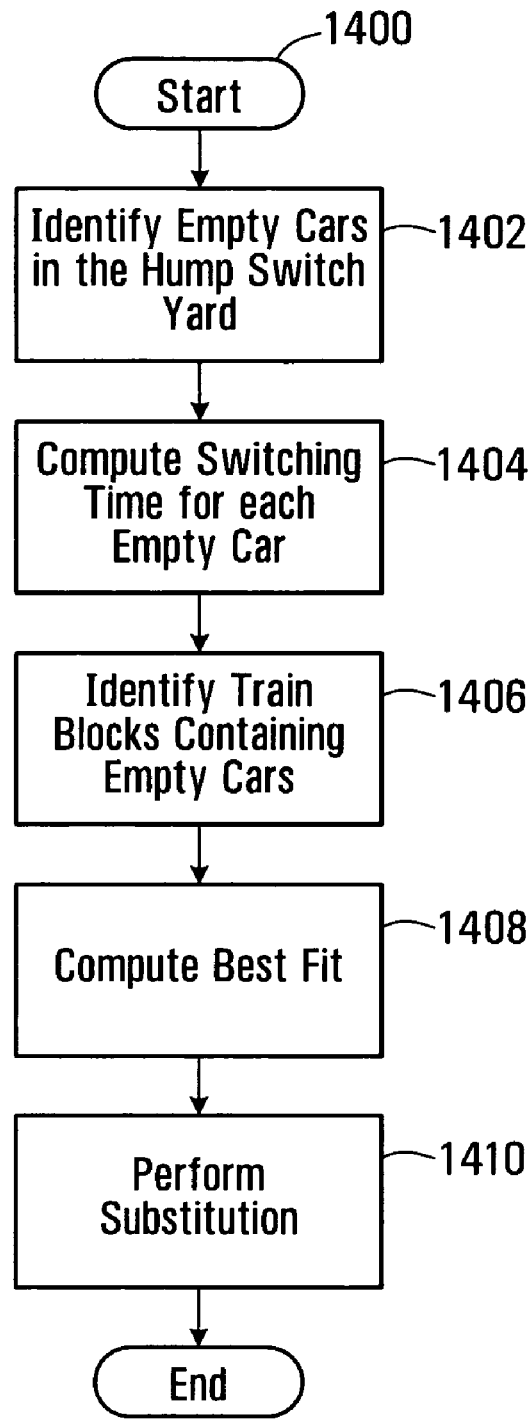

A variant of the process illustrated in FIG. 13 is shown at FIG. 14. The process starts at 1400. At steps 1402 and 1404 a list is made of the empty cars available in the hump switch yard 10 and their respective expected switching times. Those steps are identical to steps 1302 and 1304 described earlier. Next, step 1406 identifies the train blocks to be assembled that contain empty cars, similar to step 1306. At step 1408 the DTA controller 46 will compute a best fit map, trying to match the available empty cars to the demand, i.e., the empty car slots in the departure train blocks. The best fit algorithm can match an empty car to an empty car slot in a departure train block when the expected switching time for the empty car has not exceeded the pull time of the departure train block. As a match is found, the DTA controller 46 will write at step 1410 the car ID number in all the electronic records of the empty car that is part of the departure train block. Specifically, the records of the DTA controller 46 that issue switching solutions will indicate the particular empty car is to be directed to the classification track that contains other cars of the block and also data is communicated to the SRS component 30 such that the SRS component 30 is made aware of the association of that specific empty car with the train block.

The embodiment in FIG. 14 is different from the embodiment in FIG. 13 in that at the onset a pool of empty cars is created and as an empty car is needed for a departure train block, then an empty car is taken from the pool, the choice as to which car to take is made on the basis of the expected switching time of the car and the pull time of the departure train block.

A possible refinement of the empty car substitution process is to perform the substitution as described earlier but to classify the empty cars according to type, style or category. In many cases, not all empty cars that are placed on the railroad network can be substituted for one another. For example, an empty box car to carry dry goods is not likely to be substitutable to an empty car to carry liquids, for obvious reasons. Accordingly, the above substitution process is preformed in the same manner but for specific car categories. This allows performing substitution only among cars that can perform similar or identical functions. Specifically, if a car to carry liquid goods is late or missing only a similar category car will be allowed to substitute the missing or late car.

The manner in which this refinement is implemented is to create car categories in the records of the DTA controller 46. In a given category one car can be substituted in terms of functionality to any other car in the same category. The number of categories can vary and will depend on the number of different types of cars in circulation on the railroad network. For each car category the substation logic described earlier is run. This ensures that in the case of a substitution the customer will receive a car that will match his/her requirements.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A method for computing railcar switching solutions in a railway switch yard having:
   a. a switch for receiving a group of railcars to be switched, the group of railcars being arranged into two or more railcar blocks;

b. a plurality of classification tracks for receiving railcars from the switch, wherein the switch directs railcars from the group of railcars to respective classification tracks;

c. said method comprising:
  i. providing in a machine readable storage medium an electronic representation of the status of each classification track, the status capable to acquire at least two conditions namely an opened condition and a closed condition;
     1. in the opened condition the classification track is allowed to receive a railcar that belongs to any one of the railcar blocks;
     2. in the closed condition the classification track is associated with a particular one of the railcar blocks and is allowed to receive railcars from the particular one of the railcar blocks while being closed to at least another one of the railcar blocks;
  ii. computing with a computing device switching solutions for the railcars of the group of railcars, each switching solution being indicative of a classification track in which the railcar is to be directed, said computing using as a factor the status of each classification track and includes:
     1. for a railcar that is a first railcar of a given railcar block for which a switching solution is computed, selecting a classification track among the classification tracks having an opened condition;
     2. changing the status of the selected classification track in the machine readable storage medium to a closed condition;
  iii. outputting data that conveys the switching solutions.

2. A method as defined in claim 1, wherein the railway switch yard is a hump switch yard.

3. A method as defined in claim 2, wherein said computing including determining an available space for receiving cars from the particular one of the railcar blocks in one or more of the classification tracks having an opened condition.

4. A method as defined in claim 3, wherein said computing including using the determined available space as a factor for said selecting.

5. A method as defined in claim 4, wherein said determining in connection with a particular one of the classification tracks having an opened condition includes assessing if the particular one of the classification tracks has enough available space to receive the given block to which the first railcar belongs in its entirety.

6. A method as defined in claim 5, wherein said determining in connection with the particular one of the classification tracks having an opened condition includes assessing the Left Over Room (LOR) that would exist in the eventuality the given block to which the first railcar belongs is directed to the particular one of the classification tracks.

7. A method as defined in claim 6, wherein said computing includes determining the LOR in connection with several ones of the classification tracks having an opened condition and using the determined LORs as a factor for said selecting.

8. A method as defined in claim 2, including assigning the computed switching solution for the first railcar of the given railcar block to every other car of the given rail block, wherein all the railcars of the given railcar block are directed to the same classification track.

9. A method as defined in claim 2, including changing the status of the selected classification track in the machine readable storage medium to an opened condition, subsequent a computation of a switching solution for the last railcar of the given railcar block.

* * * * *